United States Patent
Kawamoto et al.

(10) Patent No.: US 7,865,899 B2
(45) Date of Patent: Jan. 4, 2011

(54) VIRTUAL COMPUTER SYSTEMS AND COMPUTER VIRTUALIZATION PROGRAMS

(75) Inventors: Shinichi Kawamoto, Hachioji (JP); Tatsuo Higuchi, Fuchu (JP); Naoki Hamanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1209 days.

(21) Appl. No.: 11/485,273

(22) Filed: Jul. 13, 2006

(65) Prior Publication Data

US 2006/0288348 A1 Dec. 21, 2006

Related U.S. Application Data

(63) Continuation of application No. 10/189,247, filed on Jul. 5, 2002, now Pat. No. 7,117,499.

(30) Foreign Application Priority Data

Nov. 22, 2001 (JP) ............................. 2001-357509

(51) Int. Cl.
*G06F 9/455* (2006.01)
*G06F 9/46* (2006.01)
*G06F 15/177* (2006.01)

(52) U.S. Cl. ........................... 718/105; 718/104; 718/1; 715/736; 715/737

(58) Field of Classification Search ........................ None
See application file for complete search history.

(56) References Cited

U.S. PATENT DOCUMENTS

| | | | |
|---|---|---|---|
| 5,784,702 A | 7/1998 | Greenstein et al. | 711/173 |
| 6,260,068 B1 | 7/2001 | Zalewski et al. | 709/226 |
| 6,279,046 B1 | 8/2001 | Armstrong et al. | 710/5 |
| 6,381,682 B2 | 4/2002 | Noel et al. | 711/153 |
| 6,408,393 B1 | 6/2002 | Imada et al. | |
| 6,438,671 B1 | 8/2002 | Doing et al. | 711/173 |

(Continued)

FOREIGN PATENT DOCUMENTS

JP 04307631 10/1992

(Continued)

OTHER PUBLICATIONS

HYTAC, "Processor Resources Management Facility (PRMF)", 8080-2-148-40.

(Continued)

*Primary Examiner*—Lewis A Bullock, Jr.
*Assistant Examiner*—Abdullah Al Kawsar
(74) *Attorney, Agent, or Firm*—Brundidge & Stanger, P.C.

(57) ABSTRACT

Disclosed are a virtual computer system and method, wherein computer resources are automatically and optimally allocated to logical partitions according to loads to be accomplished by operating systems in the logical partitions and setting information based on a knowledge of workloads that run on the operating systems. Load measuring modules are installed on the operating systems in order to measure the loads to be accomplished by the operating systems. A manager designates the knowledge concerning the workloads on the operating systems through a user interface. An adaptive control module determines the allocation rations of the computer resources relative to the logical partitions according to the loads and the settings, and issues an allocation varying instruction to a hypervisor so as to thus instruct variation of allocations.

2 Claims, 20 Drawing Sheets

U.S. PATENT DOCUMENTS

| | | | |
|---|---|---|---|
| 6,587,938 B1 | 7/2003 | Eilert et al. | 712/29 |
| 6,633,916 B2 | 10/2003 | Kauffman | 709/229 |
| 6,651,125 B2 | 11/2003 | Maergner et al. | 710/244 |
| 6,735,601 B1 * | 5/2004 | Subrahmanyam | 1/1 |
| 6,957,435 B2 * | 10/2005 | Armstrong et al. | 718/104 |
| 2002/0091786 A1 | 7/2002 | Yamaguchi et al. | 709/213 |
| 2002/0156824 A1 | 10/2002 | Armstrong et al. | 709/104 |
| 2002/0161891 A1 * | 10/2002 | Higuchi et al. | 709/226 |
| 2003/0033512 A1 * | 2/2003 | Austen et al. | 713/2 |

FOREIGN PATENT DOCUMENTS

| | | |
|---|---|---|
| JP | 6103092 | 4/1994 |
| JP | 6110715 | 4/1994 |
| JP | 09026889 | 1/1997 |
| JP | 09081401 | 3/1997 |
| JP | 10301795 | 11/1998 |
| JP | 11259316 | 9/1999 |
| JP | 2001195270 | 7/2001 |

OTHER PUBLICATIONS

Fran Kyne, et al, "z/OS Intelligent Resource Director", IBM.com/Redbooks, International Technical Support Organization, Aug. 2001.

J. D. Bagley, et al "Sharing Data and Services in a Virtual Machine System", ACM, Nov. 1975.

* cited by examiner

VIRTUAL COMPUTER SYSTEMS AND COMPUTER VIRTUALIZATION PROGRAMS

CROSS-REFERENCE TO RELATED APPLICATIONS

The present application is a continuation of application Ser. No. 10/189,247, filed Jul. 5, 2002, now U.S. Pat. No. 7,117, 499; which is related to application Ser. No. 09/942,611, filed Aug. 24, 2001, now U.S. Pat. No. 7,290,259 entitled VIRTUAL COMPUTER SYSTEM WITH DYNAMIC RESOURCE ALLOCATION", the entire contents of which are incorporated herein by reference.

BACKGROUD OF THE INVENTION

The present invention relates to a virtual computer system and to a technology for automatically and dynamically changing allocations of computer resources relative to logical partitions (LPARs) according to a limited knowledge of workloads being run on operating systems (OSs) in the LPARs and loads to be accomplished by the OSs.

Virtual computer systems are such that a hypervisor divides a physical computer into a plurality of logical partitions (LPARs), computer resources (including a CPU, a main memory, an I/O device) are allocated to the LPARs, and an operating system (OS) is run in each LPAR.

Talking of gaining access to an existing computer system by utilizing the Web (short for the World Wide Web), since it is generally hard to predict a load, many users often suddenly accesses the computer system in a concentrated manner. On such an occasion, the load peaks. On a normal occasion other than the occasion when the load peaks, the load is usually low.

It is unreasonable to allocate a large number of or a large amount of computer resources to LPARs from the beginning in case of rare occurrence of a peak load. Instead, a small number of or a small amount of resources is allocated normally. If a load of an LPAR becomes high, the number of resources to be allocated is increased in order to cope with the peak load (this is referred to as load adaptive control). Thus, the number of wasteful computer resources can be decreased or the number of supportable LPARs can be increased.

Accordingly, allocations of resources relative to LPARs must be able to be dynamically varied. A literature "HITAC Processor Resource Management Facility (PRMF)" (Manual No. 8080-2-14840 published by Hitachi Ltd.) describes dynamic variation of allocations of resources relative to LPARs. According to the manual, in order to vary allocations of resources relative to LPARs, an operator (manager) issues a resource allocation varying instruction. In response to the instruction, a hypervisor dynamically varies the allocations of the resources relative to the LPARs.

The foregoing allocation variation involving an operator cannot cope with a case where allocations must be varied quickly, that is, a case where a system failure or any other emergency occurs or a peak load arises suddenly.

In contrast, Japanese Unexamined Patent Publication Application No. 9-26889 discloses a virtual computer system that automatically varies a CPU allocation according to a change in external conditions. According to this invention, allocations of resources relative to LPARs can be automatically varied depending on whether an emergency has occurred or depending on an operation schedule without intervention of an operator. Moreover, a definition value of a CPU allocation is compared with an actual processor use time, whereby a definition value of a processor allocation ratio can be varied depending on whether the processor use time is too long or too short.

According to the related art, resources are allocated according to whether the processor use time is too long or too short. However, it is hard to infer a load to be accomplished by a computer system from the use time of a CPU. The allocation ratios of computer resources relative to LPARs cannot be appropriately varied depending on loads.

Moreover, even if a value representing a load to be accomplished in each LPAR can be learned correctly, it is hard to correctly calculate the appropriate allocation ratios of computer resources relative to LPARs from the loads alone. In particular, if workloads to be run on the OSs in the LPARs are different from one another in terms of characteristics (a steady-state load, a peak load, and a peak duration), the appropriate allocation ratios of computer resources relative to the LPARs are thought to differ from one another.

Based on correct load values and a little knowledge of workloads, there is presumably provided a system for automatically and appropriately allocating computer resources to LPARs.

SUMMARY OF THE INVENTION

Accordingly, an object of the present invention is to provide a virtual computer system and program that automatically optimally allocate computer resources to LPARs according to loads to be accomplished by OSs that run in the LPARs and, if necessary, according to system control parameters which a manager designates based on a light knowledge (the characteristics of each workload) of workloads.

According to the present invention, there is provided a virtual computer system having a hypervisor (allocating means) that divides a physical computer into a plurality of logical partitions (LPARs), that runs an operating system (OS) in each LPAR, and that controls allocation of resources of the physical computer to the LPARs. The virtual computer system consists mainly of a user interface, a load measuring means, and an adaptive control means. The user interface enables entry of one setting or a plurality of settings concerning the control actions of the virtual computer system. The load measuring means measures loads to be accomplished by the OSs in the LPARs. The adaptive control means (allocation ratio varying means) determines the allocation ratios of the computer resources relative to the LPARs according to the settings entered through the user interface and the loads to be accomplished by the OSs in the LPARs which are measured by the load measuring means. If the determined allocation ratios are different from the previous ones, the adaptive control means instructs the hypervisor to vary the allocation ratios. Furthermore, the hypervisor includes a means for dynamically varying the allocation ratios of the computer resources relative to the LPARs in response to the instruction issued from the adaptive control means.

Consequently, according to the present invention, there is provided a virtual computer system capable of dynamically and optimally allocating computer resources to LPARs according to the loads to be accomplished by OSs that run in the LPARs and a knowledge of workloads running on the OSs, and thus guaranteeing easy management and performance that matches the contents of a contract made with each

DESCRIPTION OF THE PREFERRED EMBODIMENTS

An embodiment of the present invention will be described in conjunction with the appended drawings.

1. Physical Computer

Figure 1:
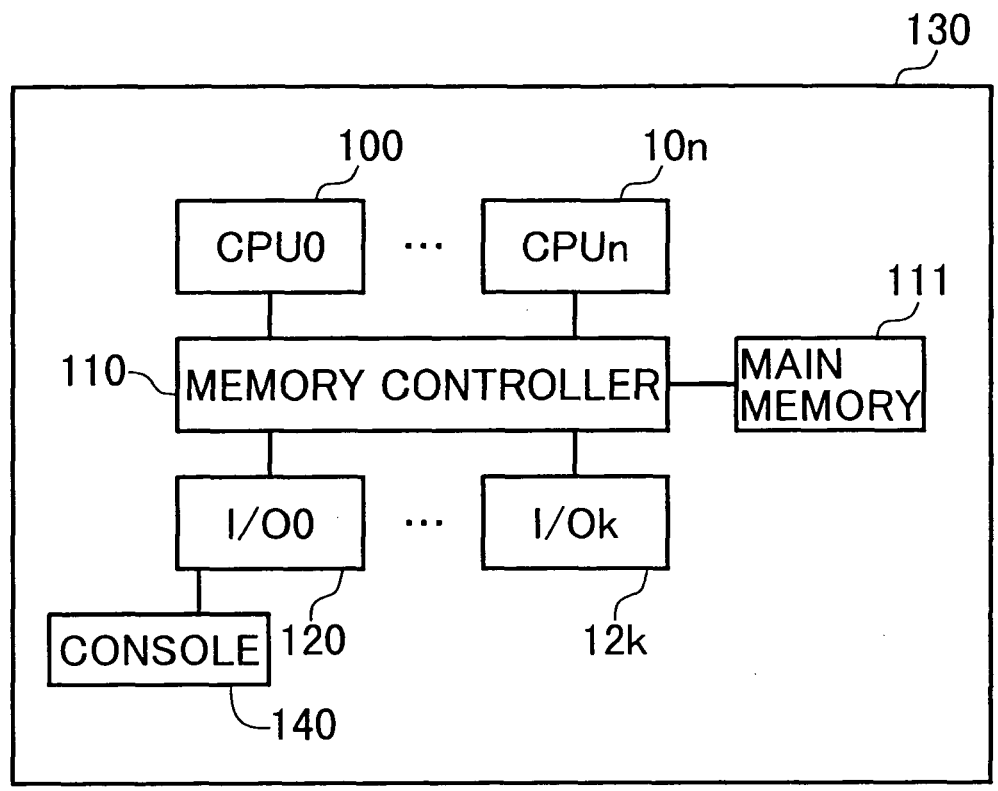
FIG. 1 shows a configuration of a physical computer in which a virtual computer system in accordance with the present invention is implemented.

FIG. 1 shows a configuration of a physical computer 130 in which a virtual computer system in accordance with the present invention is implemented. There are shown CPUs 0 to n 100 to 10n, input/output (I/O) devices 0 to k 120 to 12k, and a main memory 111. The CPUs 100 to 10n and I/O devices 120 to 12k are connected to the main memory 111 via a memory controller 110.

The number of CPUs may be one or two or more. If the number of CPUs is two or more, the CPUs 100 to 10n constitute a closely coupled multiprocessing system in which they share the same main memory 111.

A console 140 of the physical computer is connected to the I/O device 0 120.

2. Virtual Computer System

Figure 2:
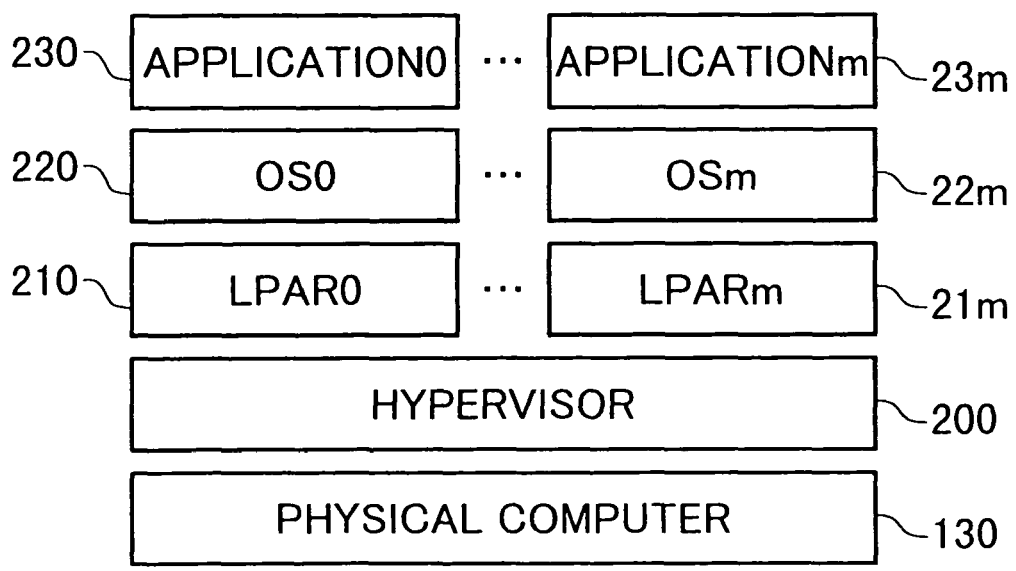
FIG. 2 is a conceptual diagram of a known virtual computer system.

FIG. 2 shows a hierarchical structure of a virtual computer system in which the present invention is implemented.

A hypervisor 200 is installed in the physical computer 130. The hypervisor 200 divides the physical computer 130 into two or more logical partitions (LPARs) 0 to m 210 to 21m. Operating systems (OSs) 0 to m (220 to 22m) are installed in the LPARs 0 to m. Applications 0 to m (230 to 23m) are run on the OSs.

The hypervisor allocates the CPUs 100 to 10n, main memory 111, and I/O devices 120 to 12k (that are called computer resources), which are included in the physical computer 130, to the LPARs 210 to 21m.

3. Dedicated Allocation and Shared Allocation

There are two methods according to which the hypervisor allocates the computer resources to the LPARs, that is, an dedicated allocation method and a shared allocation method.

The dedicated allocation method is a method of allocating specific computer resources exclusively to specific LPARs. Among the computer resources, the main memory 111 and the I/O devices 120 to 12k are allocated exclusively to specific LPARs.

Incidentally, the CPUs 100 to 10n may be allocated exclusively to specific LPARs. In this case, the number of CPUs to be allocated exclusively to specific LPARs is referred to as a CPU allocation volume relative to the LPARs.

On the other hand, shared allocation is such that the computer resources are allocated to the LPARs in a time-sharing manner. The shared allocation is applied to the CPUs alone. A ratio of the time during which a CPU is allocated to a certain LPAR to the time during which the CPUs are allocated to all the LPARs is referred to as a CPU allocation ratio (ranges from 0% to 100%).

As mentioned above, the unit of dedicated allocation is the volume, while the unit of shared allocation is the ratio. However, the ratio of the number of CPUs to be exclusively allocated to certain LPARs to a value calculated by adding 1 to the sum total of CPUs may be regarded as a CPU allocation ratio (ranging from 0% to 100%). In this case, both the dedicated allocation and shared allocation can be instructed using the unit of the ratio.

For example, assume that a physical computer having 0 and LPAR 1). In this case, if the CPU allocation ratio relative to the LPAR 0 and LPAR 1 is 50%, when the division is spatial, one CPU is allocated to each LPAR. When the division is temporal, the two CPUs are alternately allocated to the LPARs 0 and 1 during the same time interval. Thus, the CPU allocation ratio can be applied to the two cases.

However, when the physical computer is spatially divided, the allocation ratios are determined with the number of CPUs (for example, when the number of CPUs is two, the allocation ratios are confined to 0%, 50%, or 100%). When the physical computer is temporally divided, the allocation ratios are not confined to any specific values but can be freely set to any value ranging from 0% to 100%.

A description will be made on the assumption that an allocation method to be adopted is based on temporal division in which allocation ratios are not confined to any specific values. The description will be adapted to an allocation method based on spatial division, though the allocation ratios are confined to specific values.

Moreover, hereinafter, computer resources to be dynamically allocated to LPARs shall include CPUs (100 to 10n) alone. However, dynamic allocation of the main memory 111 or the I/O devices 120 to 12k is performed in the same manner as dynamic allocation of the CPUs.

4. Varying Dynamic Allocations of Computer Resources

The hypervisor 200 allocates the computer resources to the LPARs 210 to 21m according to the allocation ratios of the computer resources relative to the LPARs that are determined prior to system operation.

If a manager (operator) varies the allocation ratios at the console 140 of the physical computer, the hypervisor 200 varies the allocation ratios of the computer resources relative to the LPARs 210 to 21m.

Otherwise, the hypervisor varies the allocation ratios every time the timing specified in a schedule set in the hypervisor comes.

Aside from the implementation of the foregoing varying method, the present invention provides a feature allowing an application, which runs on the OS (any of 220 to 22m) in each LPAR (any of LPARs 210 to 21m), to issue a resource allocation varying instruction to the hypervisor. In response to the resource allocation varying instruction, the hypervisor varies allocations in reply to the instruction.

This feature can be readily realized by implementing a facility for hooking a code produced by the hypervisor using an application on the OS.

5. Configuration

Figure 3:
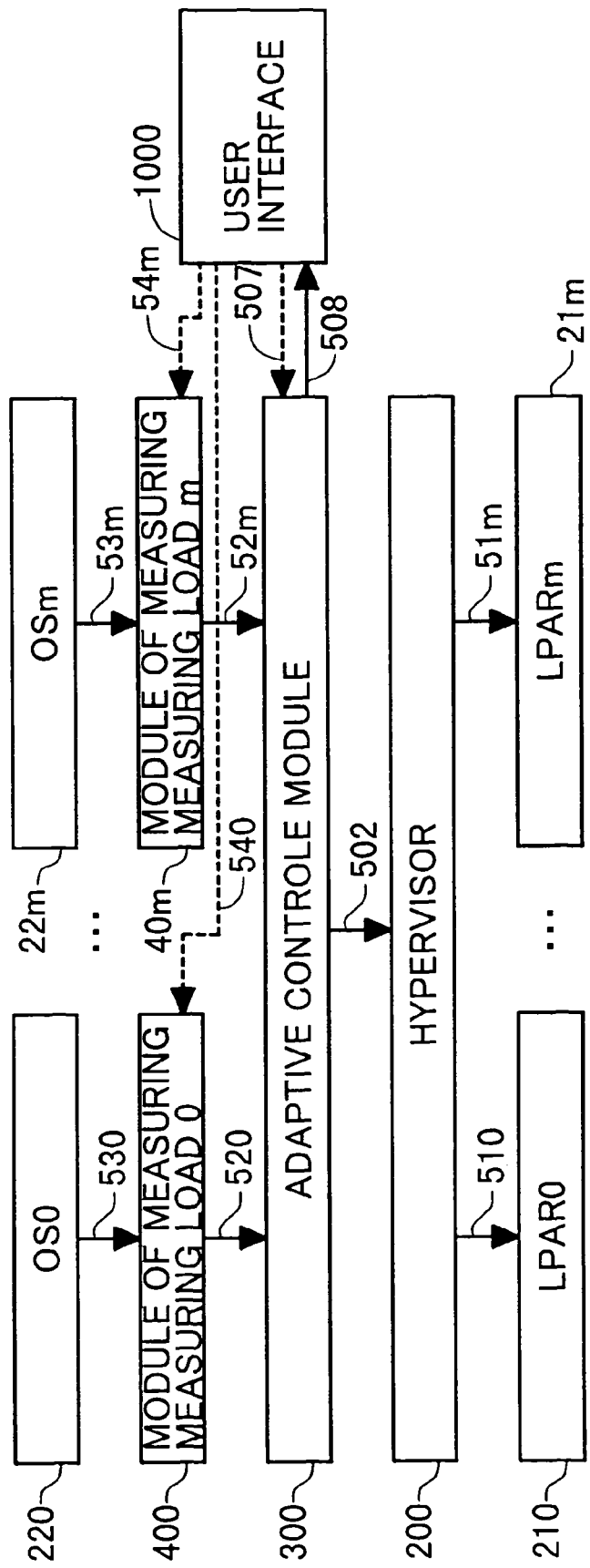
FIG. 3 is a schematic drawing showing a module configuration of the virtual computer system.

FIG. 3 shows the structure of functional modules included in a virtual computer system in which the present invention is implemented.

The virtual computer system in accordance with the present invention includes, in addition to the functional modules of the virtual computer part of which is shown in FIG. 2, load measuring modules 0 to m 400 to 40m, an adaptive control module 300, and a user interface 1000.

5.1 Load Measuring Module

The load measuring modules 0 to m 400 to 40m are applications that run on the OSs 0 to m 220 to 22m installed in the LPARs 0 200 to m 21m. The load measuring modules 0 to m measure the loads to be accomplished by the OSs 0 to m 220 to 22m.

The load measuring modules 0 to m 400 to 40m each call a load measurement library present in each of the OSs 0 to m 220 to 22m, and retrieve a load 530 to 53m indicated as a CPU use ratio (busy ratio), a memory use ratio, a disk use ratio (busy ratio), or a network use ratio (busy ratio).

The load value is expressed in the unit of percentage and ranges from 0% to 100%. The load measuring modules 0 to m 400 to 40m each receive setting information, which specifies a kind of use ratios to be measured as loads and a control cycle, from the user interface 1000 that will be described later, and measure a load according to the setting information. The loads L0 to Lm to be accomplished by the OSs 0 to m which are measured by the load measuring modules 0 to m are transferred to the adaptive control module 300 (520 to 52m).

5.2 Adaptive Control Module

The adaptive control module 300 is installed as an application, which runs on an OS, on any of the OSs 0 to m 220 to 22m. The adaptive control module 300 receives the loads L0 to Lm to be accomplished by the OSs 0 to m 220 to 22m from the load measuring modules 0 to m 400 to 40m, and calculates the allocation ratios of the computer resources relative to the LPARs 0 to m 210 to 21m. If the allocation ratios differ from the previous ones, a resource allocation varying instruction 502 is issued to the hypervisor 200.

The load measuring modules 400 to 40m communicate with the adaptive control module 300 by utilizing a related art such as a socket. Otherwise, an inter-LPAR communication technique that is also a related art may be utilized so that the OSs 0 to m 220 to 22m in the LPARs 0 to m 210 to 21m can communicate with one another via the hypervisor 200.

The adaptive control module 300 receives information of various settings, which are related to a methods of determining allocation ratios of computer resources, from the user interface 100 (507) that will be described later. Based on the setting information, the adaptive control module 300 calculates the allocation ratios S0 to Sm of the CPUs relative to the LPARs 210 to 21m using the measured loads L0 to Lm. The sum total of the CPU allocation ratios S0 to Sm relative to the LPARs 0 to m, S0+S1+Sm, comes to 100%.

In response to the resource allocation varying instruction 502 received from the adaptive control module 300, the hypervisor varies the allocation ratios of the computer resources relative to the LPARs 0 to m 210 to 21m into the values S0 to Sm (510 to 51m).

5.3 User Interface

The user interface 1000 has an ability to allow a manager or a user to designate various settings of the virtual computer system in accordance with the present invention concerning load measurement or determination of CPU allocation ratios. Moreover, the user interface 1000 has an ability to present the manager or user the loads to be accomplished by the OSs 220 to 22m or the CPU allocation ratios relative to the LPARs 210 to 21m.

Setting information is received through the user interface 1000 and transferred to the load measuring modules 400 to 40m and the adaptive control module 300 (540 to 54m, 507). Moreover, information 508 concerning the loads and allocation ratios is transferred from the adaptive control module 300 to the user interface 1000, and then displayed.

The user interface 1000 is installed on any of the OSs 0 to m 220 to 22m. Input and output screen images representing the abilities of the user interface (will be described later) are displayed over a screen image provided by the OS on which the user interface 1000 is installed. The user interface 1000, load measuring modules 400 to 40m, and adaptive control module 300 communicate with one another using the aforesaid socket or inter-LPAR communication technique.

5.4 Input User Interface

Figure 4:
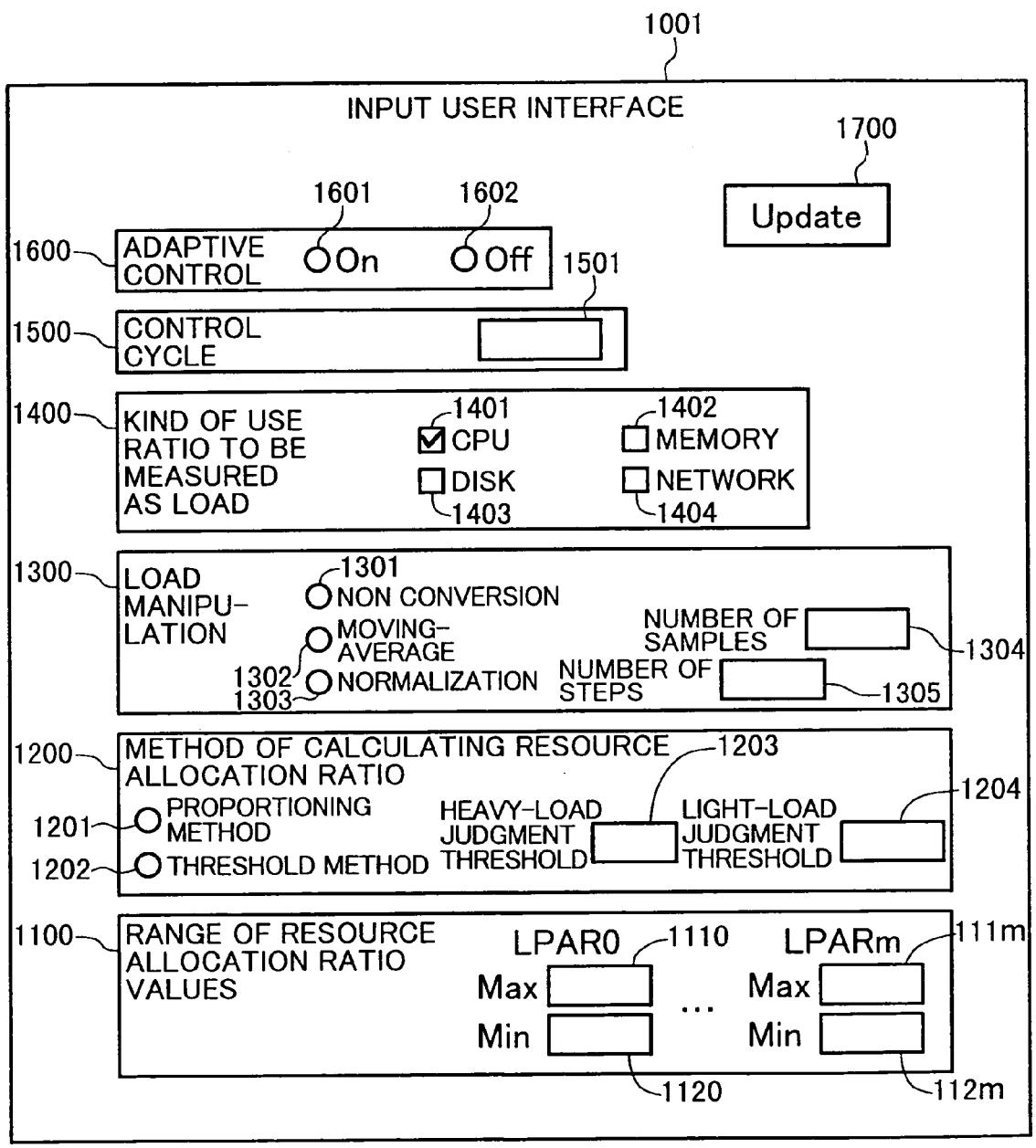
FIG. 4 shows a screen image representing an input user interface through which settings or the like can be entered.

FIG. 4 shows a screen image representing an input user interface 1001 that permits users to designate various settings. The input user interface 1001 refers is to one of the abilities of the user interface 1000 shown in FIG. 3.

The first item of entry (setting concerning whether adaptive control is valid) 1600 specifies whether load adaptive control should be performed (On or Off). Buttons 1601 and 1602 are radio buttons only one of which is turned on. When load adaptive control should be performed, the button 1601 is selected. Otherwise, the button 1602 is selected.

The second item of entry 1500 specifies a control cycle. A value to be assumed by the control cycle is entered in an entry section 1501. The unit is the second but may be the millisecond or minute. The control cycle entered in the entry section 1501 is adopted as a cycle time at intervals of which the load measuring modules 400 to 40m measure loads or the adaptive control module 300 determines allocation ratios.

The third item of entry (setting concerning a kind of use ratios to be measured as loads) 1400 specifies a kind of use ratios to be measured as loads, which are to be accomplished by the OSs 220 to 22m, by the load measuring modules 400 to 40m. Buttons 1401 to 1404 are radio buttons only one of which is turned on. A kind of use ratios associated with the selected button is an object of measurement. The button 1401 is associated with CPU use ratios. As a default option, the CPU use ratios are measured. Check boxes 1402, 1403, and 1404 are to be clicked in order to select memory use ratios, disk use ratios, or network use ratios. A check mark is displayed within a clicked check box.

The fourth item of entry (setting concerning load manipulation) 1300 specifies what kind of manipulation is performed on the loads LO to Lm measured by the load measuring modules 400 to 40m. Buttons 1301, 1302, and 1303 are radio buttons only one of which is turned on. If the button 1301 is selected, the loads LO to Lm are not manipulated at all. If the button 1302 is selected, the moving averages of the loads LO to Lm are calculated. The number of samples whose moving averages are calculated is specified in an entry section 1304. The entry section 1304 becomes valid only when the button 1302 is turned on. If the button 1303 is selected, the loads LO to Lm are normalized. The number of steps associated with discrete values required for normalization is specified in an entry section 1305. The entry section 1305 becomes valid only when the button 1303 is turned on.

Manipulated loads LAO to LAm result from manipulation of the loads LO to Lm. If the button 1301 is selected in order not to manipulate the loads, the manipulated loads assume the same values as the measured loads (LAO=LO, . . . , Lam=Lm). Moving average calculation and normalization will be described later (in relation to a load manipulation sequence).

The fifth item of entry (setting concerning allocation ratio calculation) 1200 specifies an allocation ratio calculation method according to which the CPU allocation ratios relative to the LPARs 210 to 21m are calculated based on the manipulated loads LAO to LAm. Buttons 1201 and 1202 are radio buttons only one of which is turned on. If the button 1201 is selected, a proportioning method is adopted as the allocation ratio calculation method.

If the button 1202 is selected, a threshold method is adopted as the allocation ratio calculation method. When the threshold method is adopted, a heavy-load judgment threshold is specified in an entry section 1203 and a light-load judgment threshold is specified in an entry section 1204. The entry sections 1203 and 1204 become valid only when the threshold method is adopted as the allocation ratio calculation method.

CPU allocation ratios (tentative CPU allocation ratios) SNO to SNm relative to the LPARs 210 to 21m are calculated according to the allocation ratio calculation method. The proportioning method and threshold method will be described in relation to an allocation ratio calculation sequence later.

The sixth item of entry (setting concerning a range of allocation ratio values) 1100 specifies a range of values to be assumed by the CPU allocation ratios relative to the LPARs 210 to 21m (upper and lower limits or maximum and minimum values). An upper limit and a lower limit for an allocation ratio value are specified relative to each LPAR (in any of entry sections 1110 to 111m and any of entry sections 1120 to 112m). Both the upper and lower limits range from 0 to 100. The tentative CPU allocation ratios SNO to SNm relative to the LPARs 210 to 21m resulting from allocation ratio calculation are corrected so that they will not exceed the upper limits (specified in the entry sections 1110 to 111m) and fall below the lower limits (specified in the entry sections 1120 to 112m).

The corrected tentative CPU allocation ratios shall be CPU allocation ratios SO to Sm. The upper limits and lower limits are specified for the CPU allocation ratios SO to Sm, whereby the minimum values for the application ratios can be guaranteed and the maximum values therefor can be confined to specific values. The upper and lower limit values are determined when a contract is made with customers who use the LPARs.

Correcting allocation ratios according to the designated ranges of allocation ratio values will be described in relation to an allocation ratio correction sequence later.

A button 1700 is used to actually validate the designated settings for the items of entry 1100 to 1600. For example, when it is designated for the first item of entry 1600 that load adaptive control is ON, the button 1601 is selected first. Thereafter, the button 1700 is clicked for validation.

The designated settings for the items of entry 1300, 1400, and 1500 are passed to the load measuring modules 400 to 40m. All the designated settings for the items of entry 1100 to 1600 are passed to the adaptive control module 300. The load measuring modules 400 to 40m and the adaptive control module 300 act based on the settings.

A manager determines the items of entry 1100 to 1600 in consideration of the characteristics of the workloads that run on the OSs 220 to 22m.

5.5 Output User Interface

Figure 5:
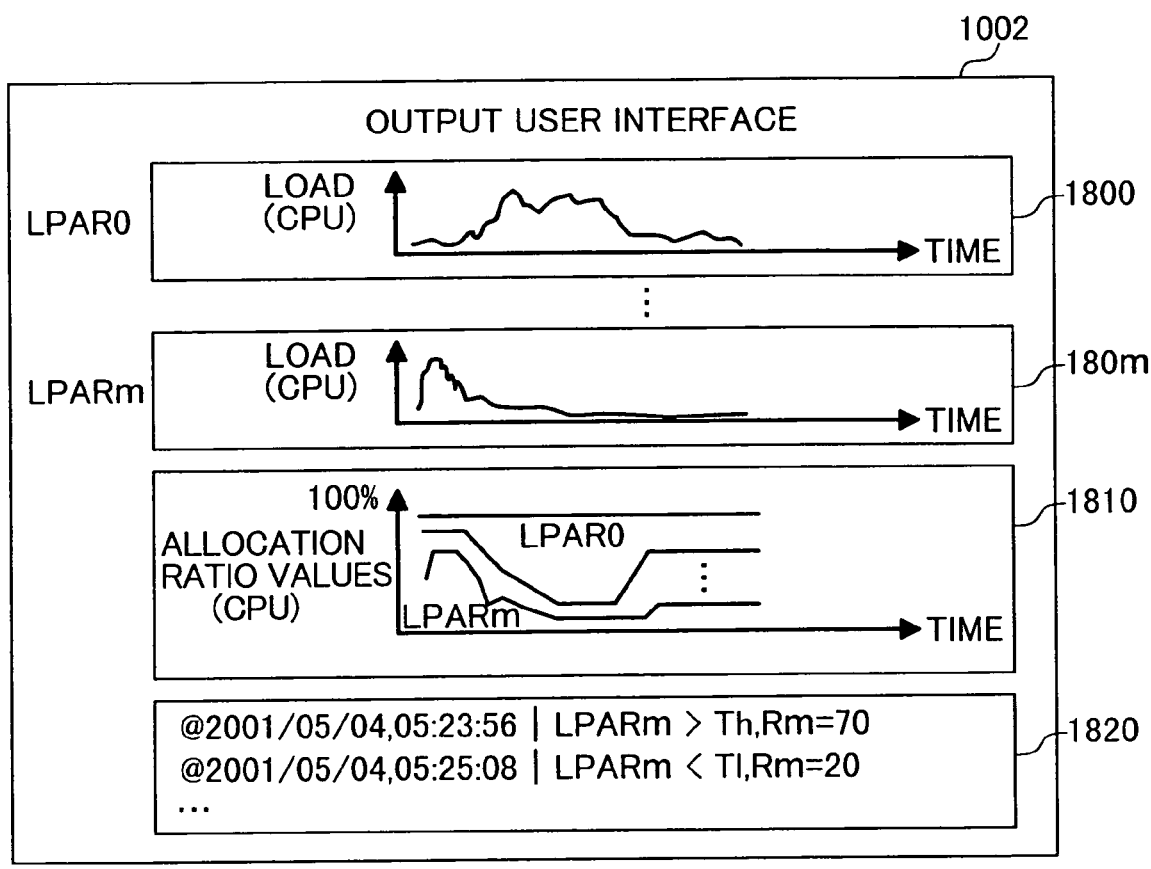
FIG. 5 shows a screen image representing an output to be accomplished in LPARs, a time-series behavior of a CPU allocation ratio, and the reasons for variation of allocation ratios are displayed.

FIG. 5 shows a screen image representing an output user interface 1002 that refers to one of the abilities of the user interface 1000 to graphically display loads to be accomplished in the LPARs 210 to 21m and allocation ratios relative to the LPARs 210 to 21m.

In display sections 1800 to 180m, time-series behavior of the loads to be accomplished in the LPARs 210 to 21m are graphically displayed. Herein, the loads may be the loads LO to Lm measured by the load measuring modules 400 to 40m or the manipulated loads LAO to LAm resulting from manipulation of the loads LO to Lm. Otherwise, both of the measured loads and manipulated loads may be graphically displayed. Otherwise, a user may designate which of the measured loads and manipulated loads are graphically displayed.

In a display section 1810, time-series behavior of the CPU allocation ratios relative to the LPARs 210 to 21m are graphically displayed. Incidentally, the sum total of the CPU allocation ratios relative to the LPARs (210 to 21m) comes to 100%. A CPU allocation ratio relative to a certain LPAR i at a certain time instant is expressed with a vertical length from an origin to a point on the axis of ordinates indicated with a curve LPARi in the graph within the display section 1810. In a display section 1820, time instants at which allocations are varied and the reasons for the variation of allocations are listed.

The output user interface 1002 receives information 508 concerning loads and allocation ratios from the adaptive control module 300, and displays it as shown in FIG. 5.

A manager who manages the virtual computer system in accordance with the present invention looks at the output user interface 1002 so as to acquire information of how the loads to be accomplished in the LPARs 210 to 21m are changing or whether adaptive control is extended properly. The manager reviews the information at the time of designating load adaptive control, whereby the virtual computer system can be operated more efficiently.

5.6 Adaptive Control

An adaptive control sequence to be performed by the virtual computer system in accordance with the present invention will be described in conjunction with the flowcharts of FIG. 6 to FIG. 14.

Figure 6:
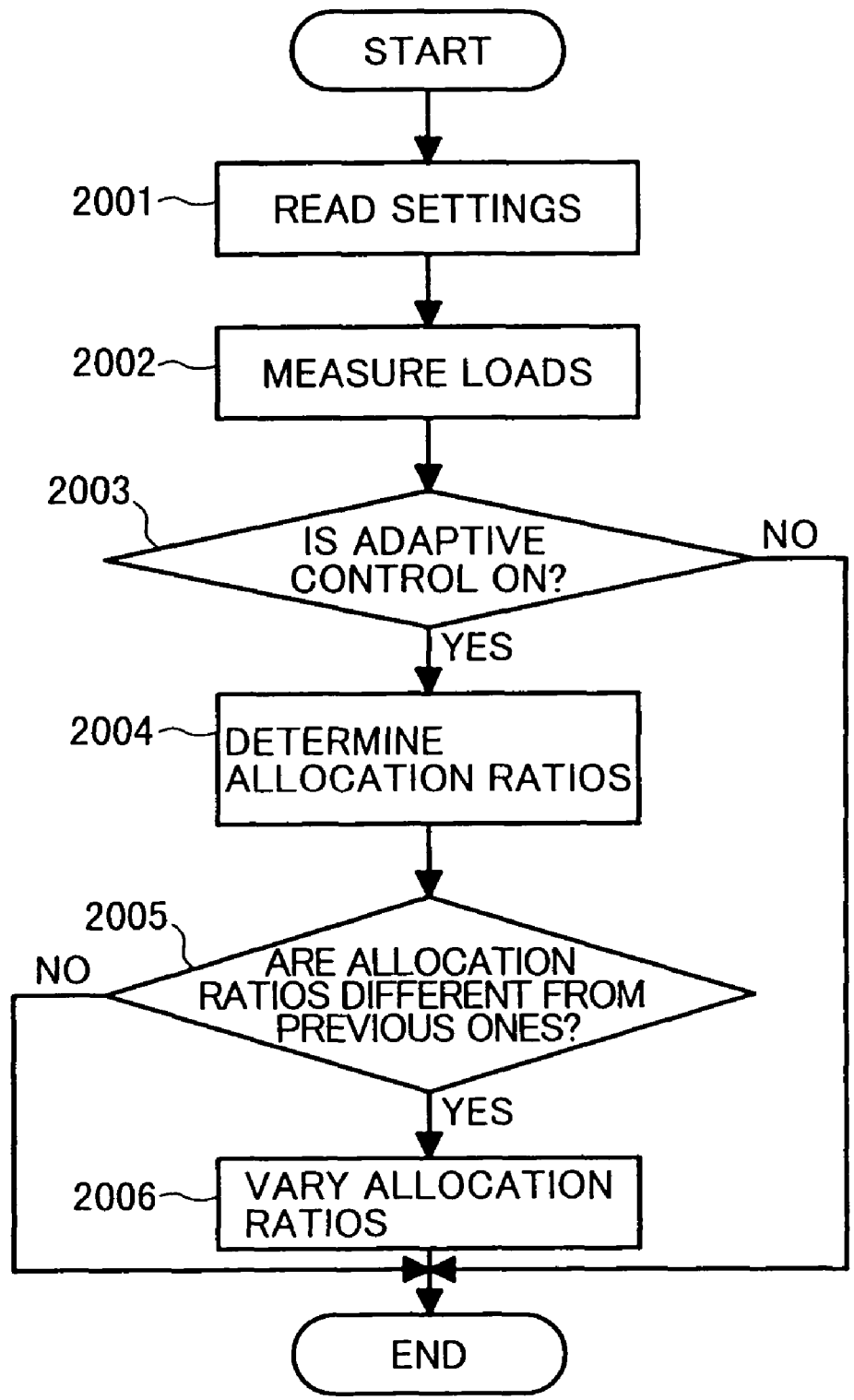
FIG. 6 is a flowchart outlining main part of a load adaptive control sequence for varying allocation ratios of computer resources relative to LPARs according to loads.

FIG. 6 outlines a load adaptive control sequence. In the load adaptive control sequence, first, the settings designated through the input interface 1001 is shown in FIG. 4 are read at step 2001. The load measuring modules 400 to 40m and the adaptive control module 300 read the settings.

Loads are measured at step 2002. The load measuring modules 400 to 40m measure the loads.

At step 2003, the setting for the item of entry 1600 concerning whether load adaptive control is ON, which is designated through the input user interface, is checked. If the setting signifies that load adaptive control is ON, load adaptive control is extended at step 2004 and thereafter. Otherwise, the sequence is terminated.

At step 2004, the CPU allocation ratios SO to Sm relative to the LPARs 210 to 21m are determined. If it is judged at step 2005 that one or more of the determined allocation ratios differ from counterparts of the previous allocation ratios SOO to SOm, a resource allocation varying instruction that instructs variation of CPU allocation ratios is issued to the hypervisor 200 at step 2006. Consequently, the allocations are varied and the sequence is terminated. If the allocation ratios are identical to the previous ones, the resource allocation varying instruction is not issued but the sequence is terminated. The adaptive control module 300 performs a sequence from step 2003 to step 2006 preceding issuance of the allocation varying instruction.

In the virtual computer system in accordance with the present invention, the sequence described in FIG. 6 is repeatedly performed at intervals of a control cycle. The control cycle is specified in the entry section 1501 contained in the input user interface 1001.

5.7 Load Measurement

Figure 7:
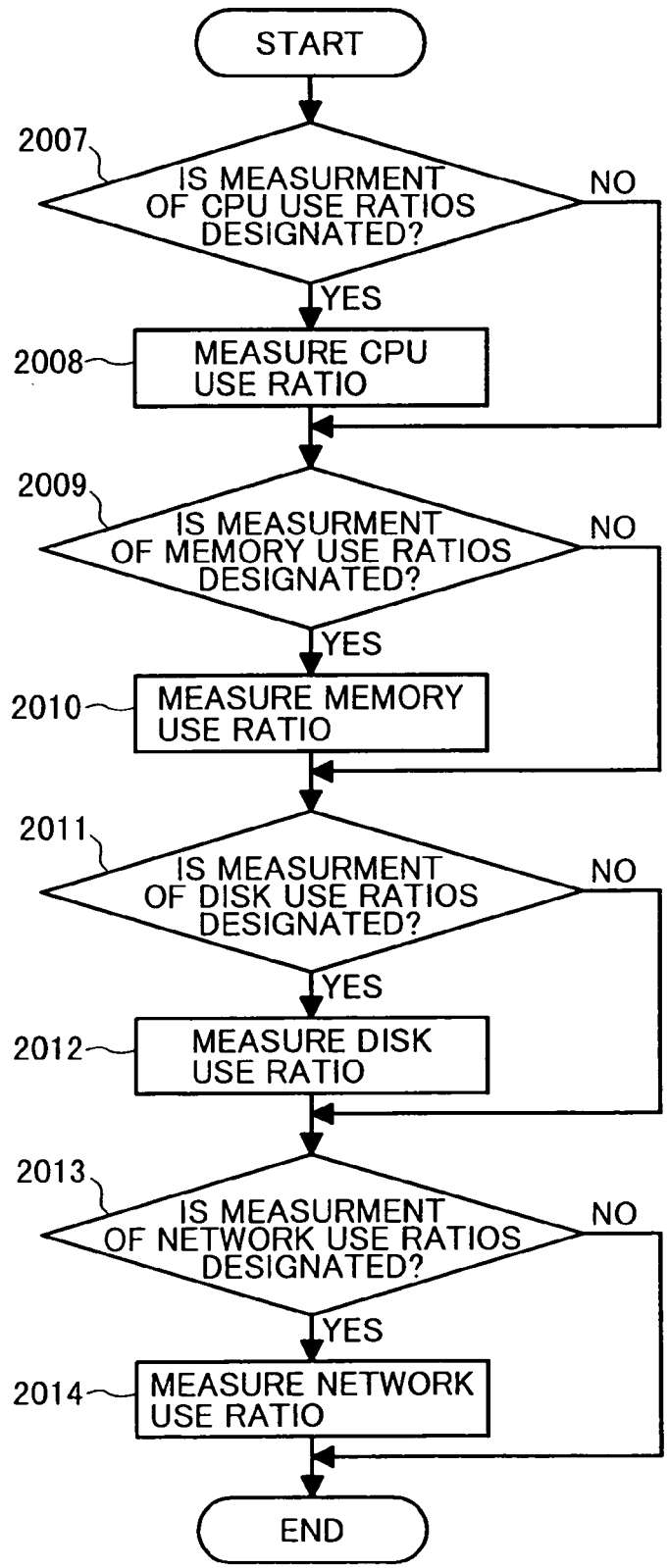
FIG. 7 is a flowchart describing a load measurement sequence to be performed by load measurement modules.

FIG. 7 details step 2002 of a load measurement sequence that is part of the adaptive control sequence described in FIG. 6. The load measuring modules 400 to 40m perform load measurement, that is, measure the loads LO to Lm to be accomplished by the OSs 220 to 22m according to a kind of use ratios to be measured as loads which is specified in the item of entry 1400 for a kind of use ratios to be measured as loads. The item of entry 1400 is contained in the input user interface 1001.

If it is found at step 2007 that measurement of CPU use ratios is designated as a kind of use ratios to be measured as loads, a CPU use ratio relative to an LPAR i is measured at step 2008. The measured value is regarded as a load Li.

If it is found at step 2009 that measurement of memory use ratios is designated as a kind of use ratios to be measured as loads, a memory use ratio relative to the LPAR i is measured at step 2010. The measured value is regarded as the load Li.

If it is found at step 2011 that measurement of disk use ratios is designated as a kind of use ratios to be measured as loads, a disk use ratio relative to the LPAR i is measured at step 2012. The measured value is regarded as the load Li.

If it is found at step 2013 that Network Use Ratios is designated as a kind of use ratios to be measured as loads, a network use ratio relative to the LPAR i is measured at step 2014. The measured value is regarded as the load Li. For measurement of various kinds of use ratios, a load measurement library residing on each of the OSs 220 to 22m is employed.

5.8 Allocation Ratio Determination

Figure 8:
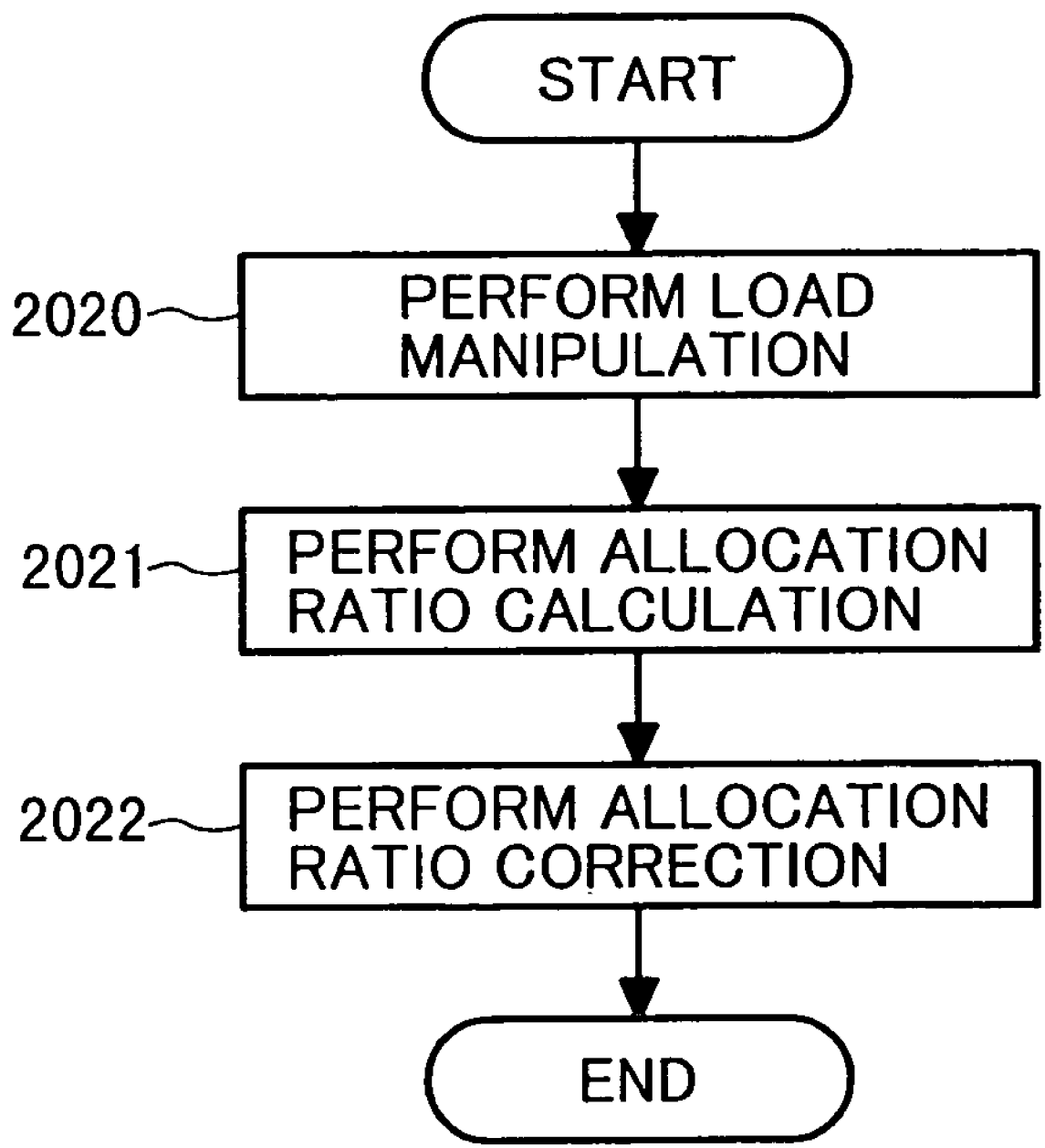
FIG. 8 is a flowchart describing a sequence according to which an adaptive control unit determines CPU allocation ratios according to loads measured by the load measurement modules.

FIG. 8 details step 2004 of an allocation ratio determination sequence that is performed as part of the adaptive control sequence described in FIG. 6. In the allocation ratio determination sequence, the loads LO to Lm to be accomplished by the OSs 220 to 22m, which are measured during load measurement, are manipulated in order to obtain manipulated loads LAO to LAm at step 2020.

At step 2021, tentative CPU allocation ratios SNO to SNm relative to the LPARs 0 to m 210 to 21m are calculated based on the manipulated loads LAO to LAm (allocation ratio calculation).

At step 2022, the tentative CPU allocation ratios SNO ratios SNO to SNm will fall within the ranges of allocation ratio values relative to the LPARs. The ranges of allocation ratio values are defined with the upper limits and lower limits specified in the entry sections 1110 to 111m contained in the input user interface 1001 and the entry sections 1120 to 112m contained therein respectively. The sequence is then terminated.

5.9 Load Manipulation

Figure 9:
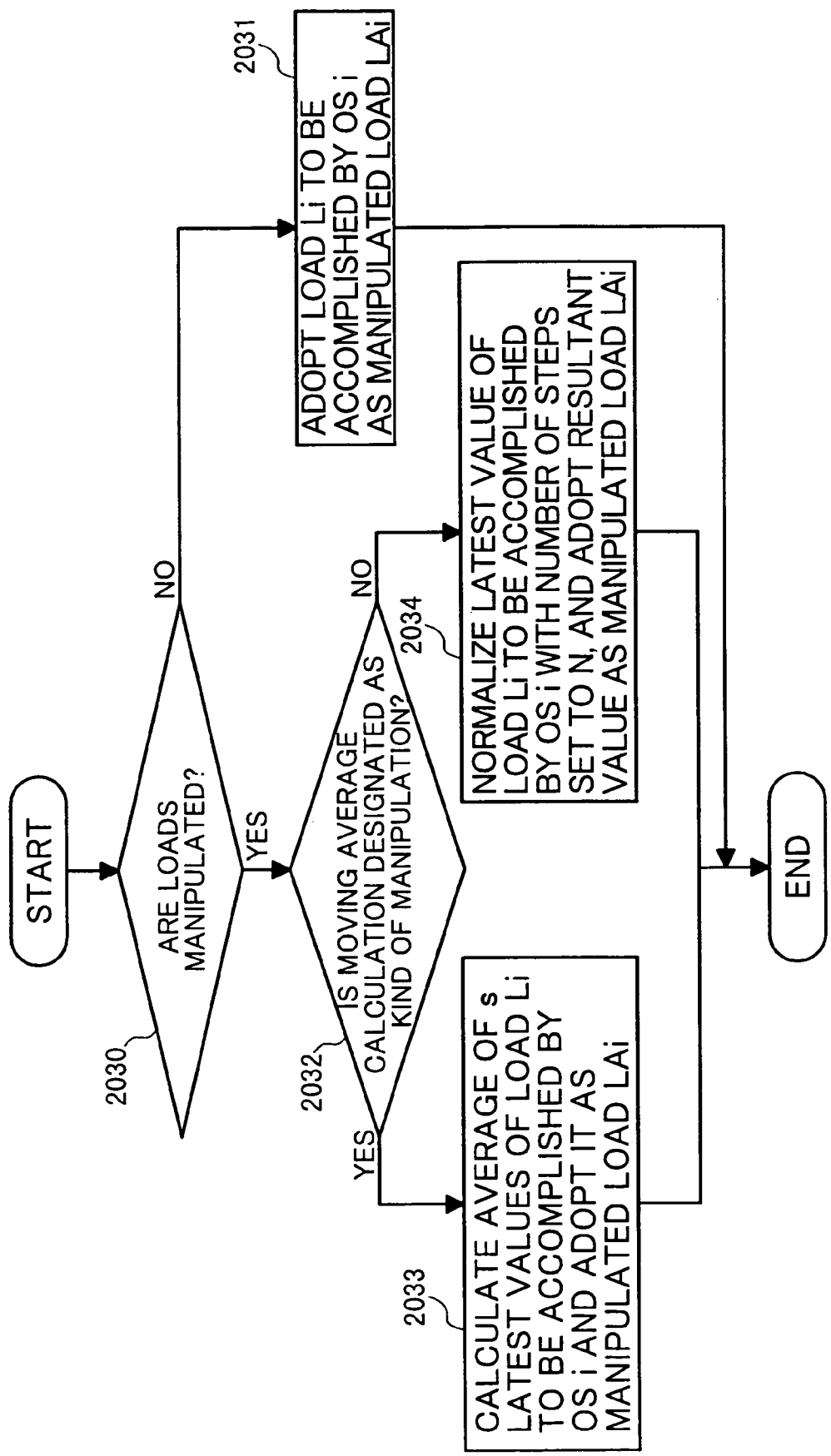
FIG. 9 is a flowchart describing a sequence of manipulating loads that is performed as part of an allocation ratio determination sequence.

FIG. 9 details step 2020 of a load manipulation sequence that is performed as part of the allocation ratio determination sequence described in FIG. 8.

First, it is checked at step 2030 whether the setting for the item of entry 1300 contained in the input user interface 1001 signifies that load manipulation will not be performed (non conversion). If load manipulation will not be performed, the loads LO to Lm are adopted as the manipulated loads LAO to LAm as they are at step 2031 (LAO=LO . . . , LAm=Lm). The sequence is then terminated.

In contrast, if load manipulation will be performed, it is judged at step 2032 whether a kind of manipulation is moving average calculation. If the moving average calculation is designated, the moving averages of the loads are calculated at step 2033.

For the moving average calculation, the past values of the loads LO to Lm measured by the load measuring modules (400 to 40m) are preserved. The number of preserved values is calculated by subtracting 1 from the number of samples S specified in the entry section 1304 in the item of entry 1300 for the setting concerning load manipulation.

Herein, the value of a load Li to be accomplished by an OS i in an LPAR which is succeeded by k values ($0<k<S$), shall be a value $Li(k)$. Values $Li(S-1), \ldots$, and $Li(1)$ of the load Li to be accomplished by the OS i are preserved. A moving average is an average of S values of the load Li to be accomplished by an OS which includes the latest value, that is, values of a sequence $Li(0), Li(1), \ldots, Li(S-1)$. The calculated average is regarded as a manipulated load LAi. Namely, $LAi=(Li(0)+Li(1)+ \ldots +Li(S-1))/S$ is solved. This calculation is performed in relation to every OS (LPAR), whereby manipulated loads LAO to LAra are calculated. The sequence is then terminated.

In contrast, if normalization is designated as a kind of manipulation, a load Li to be accomplished by an OS i is normalized.

Normalization is such that a value is fitted to any of pre-set discrete values. The number of steps with which the discrete values required for normalization are associated is a value (N) specified in the entry section 1305 for the number of steps in the item of entry 1300 for the setting concerning load manipulation contained in the input user interface 1001.

A manipulated load $LA_i$ calculated by normalizing the load $L_i$, which is to be accomplished by each OS i, with the number of steps set to N is provided as $LA_i$ (floor ($L_i \cdot N/100$)+ 1) 100/N. This calculation is performed in relation to every OS (LPAR), whereby manipulated loads LA0 to LAm are obtained. The sequence is then terminated.

Incidentally, each of the load measuring modules 400 to 40m may perform load manipulation in relation to each of the OSs 220 to 22m or the adaptive control module 300 may perform it. When the load measuring modules perform load manipulation, values 520 to 52m transferred from the load measuring modules 400 to 40m to the adaptive control module 300 are the manipulated loads LA0 to LAm.

When the adaptive control module 300 performs load manipulation, the values 520 to 52m transferred from the load measuring modules 400 to 40m to the adaptive control module 300 are the loads L0 to Lm.

5.10 Allocation Ratio Calculation

Figure 10:
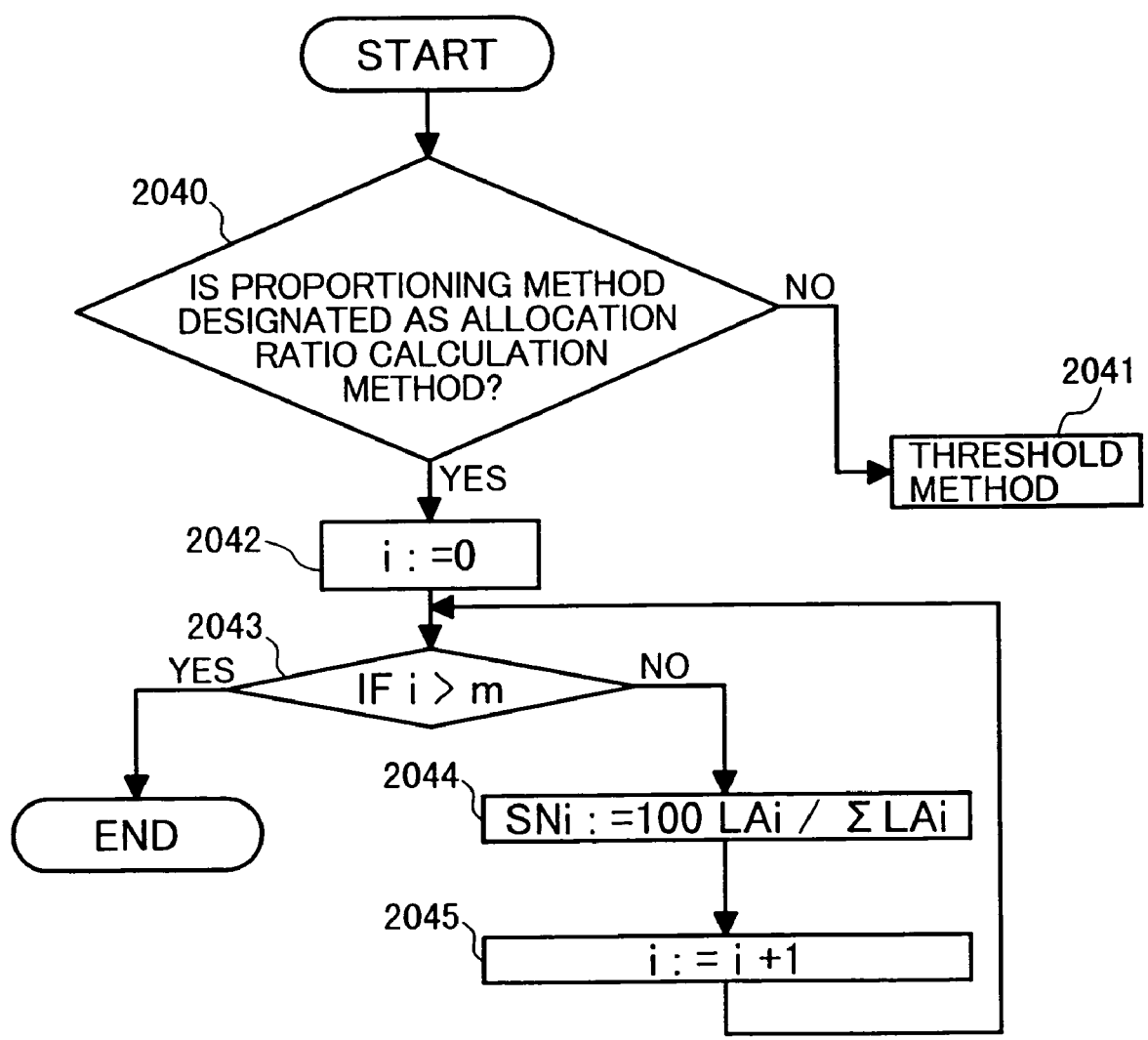
FIG. 10 is a flowchart describing a sequence of calculating tentative CPU allocation ratios that is performed as part of the allocation ratio determination sequence.

FIG. 10 details step 2021 of an allocation ratio calculation sequence that is performed as part of the allocation ratio determination sequence described in FIG. 8.

First, it is checked at step 2040 whether the item of entry 1200 for the setting concerning allocation ratio calculation, which is contained in the input interface 1001, specifies the proportioning method or threshold method. If the proportioning method is selected, steps 2042 to 2045 are carried out.

5.10.1 Proportioning Method

A loop counter i is initialized to 0 at step 2042. Steps 2044 and 2045 are repeatedly performed until it is found at step 2043 that the value indicated by the loop counter i gets larger than m.

At step 2044, tentative CPU allocation ratios $SN_i$ are calculated based on manipulated loads LA0 to LAm. $\Sigma LA_i$ written at step 2044 in FIG. 10 signifies the sum total of all the manipulated loads LA0 to LAm.

$$SN_i := 100 LA_i / \Sigma LA_i$$

Herein, the ratio of a manipulated load $LA_i$ to be accomplished by an OS i to the sum of all the manipulated loads is expressed in a percentage. A CPU allocation ratio $SN_i$ relative to an LPAR i is therefore proportional to the manipulated load $LA_i$ to be accomplished by the OS i.

The loop counter i is incremented by one at step 2045, and control is returned to step 2043. The sequence from step 2043 to step 2045 is repeatedly carried out. Consequently, the tentative CPU allocation ratios SN0 to SNm relative to the LPARs 0 to m 210 to 21m are calculated. The sequence is then terminated.

5.10.2 Threshold Method

Figure 11:
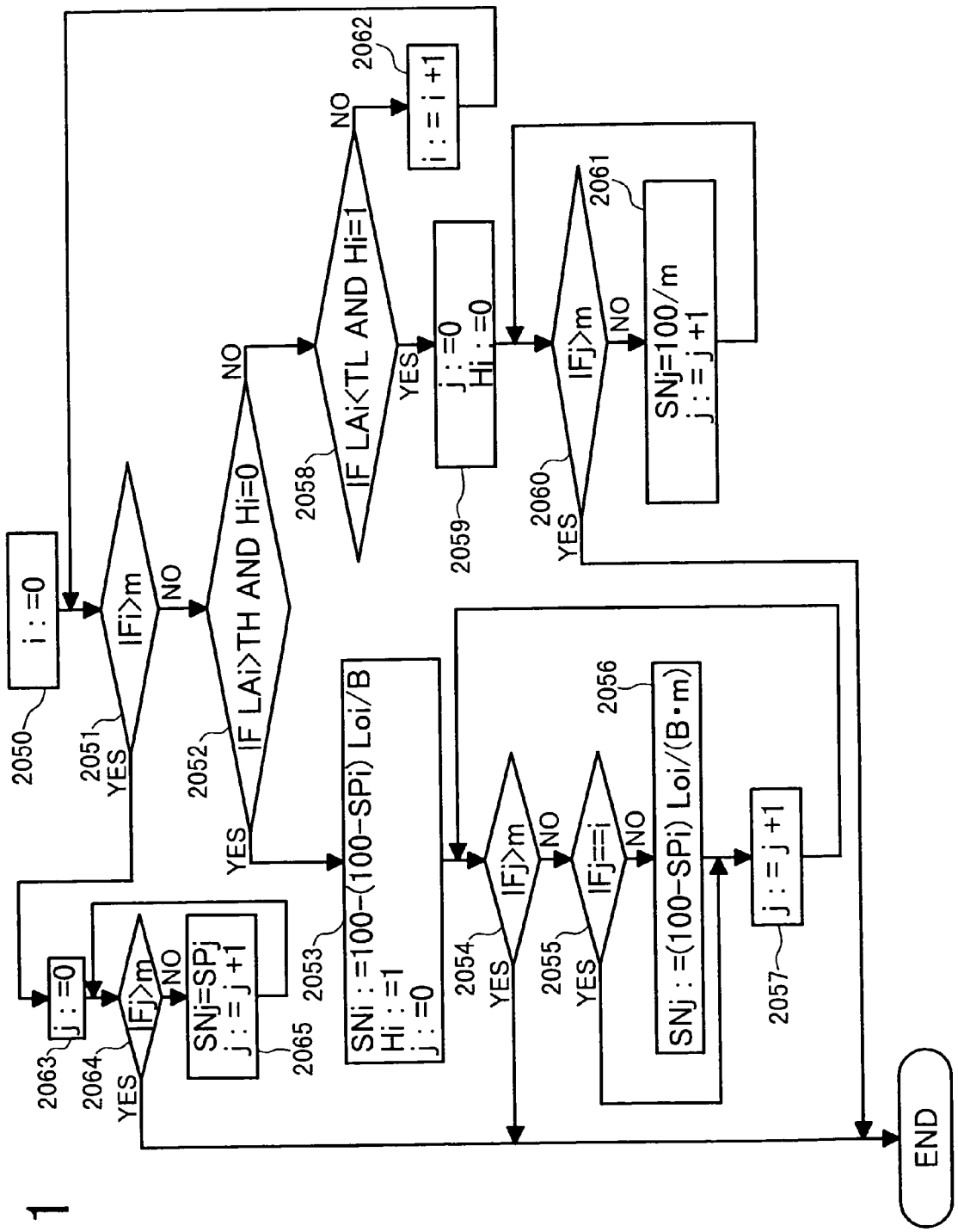
FIG. 11 is a flowchart describing a sequence of calculating tentative CPU allocation ratios according to a threshold method.

If the threshold method is designated as an allocation ratio calculation method, step 2041 is performed. FIG. 11 details the step 2041.

First, the loop counter i is initialized to 0 at step 2050. Step 2052 and subsequent steps are repeated until it is found at step 2051 that the loop counter value i is larger than m. It is then judged at step 2052 whether a manipulated load $LA_i$ to be accomplished by an OS i is larger than a heavy-load judgment threshold TH. The heavy-load judgment threshold TH is specified in the entry section 1203 relevant to the threshold method specified in the item of entry 1200 for the setting concerning an allocation ratio calculation method which is contained in the input user interface 1001. Moreover, it is judged at step 2052 whether a flag $H_i$ indicating that the OS i is heavily loaded is set. If it is judged that the manipulated load $LA_i$ is larger than the threshold TH ($LA_i$>TH) and that the flag $H_i$ is 0, that is, that a load that has been light becomes heavy, control is passed to step 2053. The sequence is performed in order to cope with a case where the OS i gets heavily loaded.

Specifically, as step 2053, a tentative CPU allocation ratio $SN_i$ is set to a value calculated by solving an expression of 100−(100−S9i)Loi/B. Herein, $SP_i$ denotes a CPU allocation ratio calculated during the previous load adaptive control sequence, and Loi denotes the sum of manipulated loads LN to be accomplished by OSs j other than the OS i. B denotes an upper limit up to which a load to be accomplished by an OS in an LPAR that is a light load is intensified.

The sum total of the loads to be accomplished by the OSs other than the current OS i is Loi. At this time, a CPU allocation ratio relative to any LPAR other than the LPAR i is calculated as (100−$SP_i$).

Since the load to be accomplished by the current OS i is heavy, the CPU allocation ratios relative to the LPARs other than the LPAR i in which the OS i runs should be decreased, and the CPU allocation ratio relative to the LPAR i should be increased.

Therefore, the CPU allocation ratios relative to the LPARs other than the LPAR i are decreased so that the sum of the loads to be accomplished by the OSs other than the OS running in the LPAR i will become equal to B. The decreases are added to the CPU allocation ratio relative to the LPAR i.

The foregoing calculation is expressed as follows:

$$SN_i := 100 - (100 - SP_i) La_i / B$$

When $SN_i$ is calculated, the flag $H_i$ indicating whether an OS i is heavily loaded is set to 1. Moreover, a loop counter j is initialized to 0.

At step 2053, a tentative CPU allocation ratio relative to the heavily-loaded OSi is calculated. At steps 2054 to 2057, the CPU allocation ratios relative to the LPARs other than the LPAR in which the OS i runs are decreased.

Specifically, steps 2055 to 2057 are repeated until it is judged at step 2054 that j is larger than m. Since the tentative CPU allocation ratio $SN_i$ relative to the LPAR LPAR i has already been calculated at step 2053, it is judged at step 2055 whether j equals i. If j equals i, step 2056 is skipped.

At step 2056, the tentative CPU allocation ratio $SN_j$ calculation method is such that a value calculated by subtracting the tentative CPU allocation ratio relative to the LPAR i from 100 is divided by the number of LPARs other than the LPAR i. This calculation is expressed as follows:

$$SN_j := (100 - SP_i) Loi / (B:m)$$

At step 2057, the loop counter j is incremented by 1, and control is returned to step 2054. When the loop is escaped at step 2054, all the tentative CPU allocation ratios $SN_j$ relative to the LPARs 210 to 21m have been calculated. The sequence is then terminated.

In contrast, if it is judged at step 2052 that the value of a manipulated load $LA_i$ does not exceed the heavy-load judgment threshold TH or the flag $H_i$ indicating whether an OS is heavily loaded is 1 ($H_i$=1), steps 2058 and thereafter are performed.

If it is judged at step 2058 that the value of the manipulated load $LA_i$ is smaller than the light-load judgment threshold TL and the flag $H_i$ indicating whether an OS i is heavily loaded is 1, that is, a heavy load to be accomplished by the OS is lightened, the CPU allocation ratios relative to all the LPARs are calculated so that they will be equal to one another.

Specifically, at step 2059, the loop counter j is initialized to 0 and the flag $H_i$ indicating whether an OS is heavily loaded is reset to O. Step 2061 is repeatedly performed until it is judged at step 2060 that the loop counter value j becomes equal to m. At step 2061, a tentative CPU allocation ratio SNj relative to an LPAR j is calculated as 100/m, and the loop counter is then incremented by one. Control is then returned to step 2060. When the condition stated at step 2060 is true, the loop is escaped. The tentative CPU allocation ratios SN0 to SNm relevant to the LPARs 210 to 21m have been calculated as 100/m. The sequence is then terminated.

If it is judged at step 2058 that a manipulated load LAi to be accomplished by an OS i is larger than the light-load judgment threshold or the OS i is not heavily loaded (the flag Hi is 0), the loop counter i is incremented by 1 at step 2062. Control is then returned to step 2051.

If the condition stated at step 2051 is true, a load to be accomplished by any of the OSs 220 to 22m will not make a change that satisfies the condition stated at step 2052 or 2058 (that makes the condition true). At steps 2063 and thereafter, a tentative CPU allocation ratio SNj relative to an LPAR j is set to the same value as a CPU allocation ratio SPj relative to the LPAR j calculated during the immediately preceding adaptive control sequence (SNj:=SPj). This is performed relative to all the LPARs 210 to 21m (at steps 2063, 2064, and 2065). The sequence is then terminated.

5.11 Allocation Ratio Correction

Figure 12:
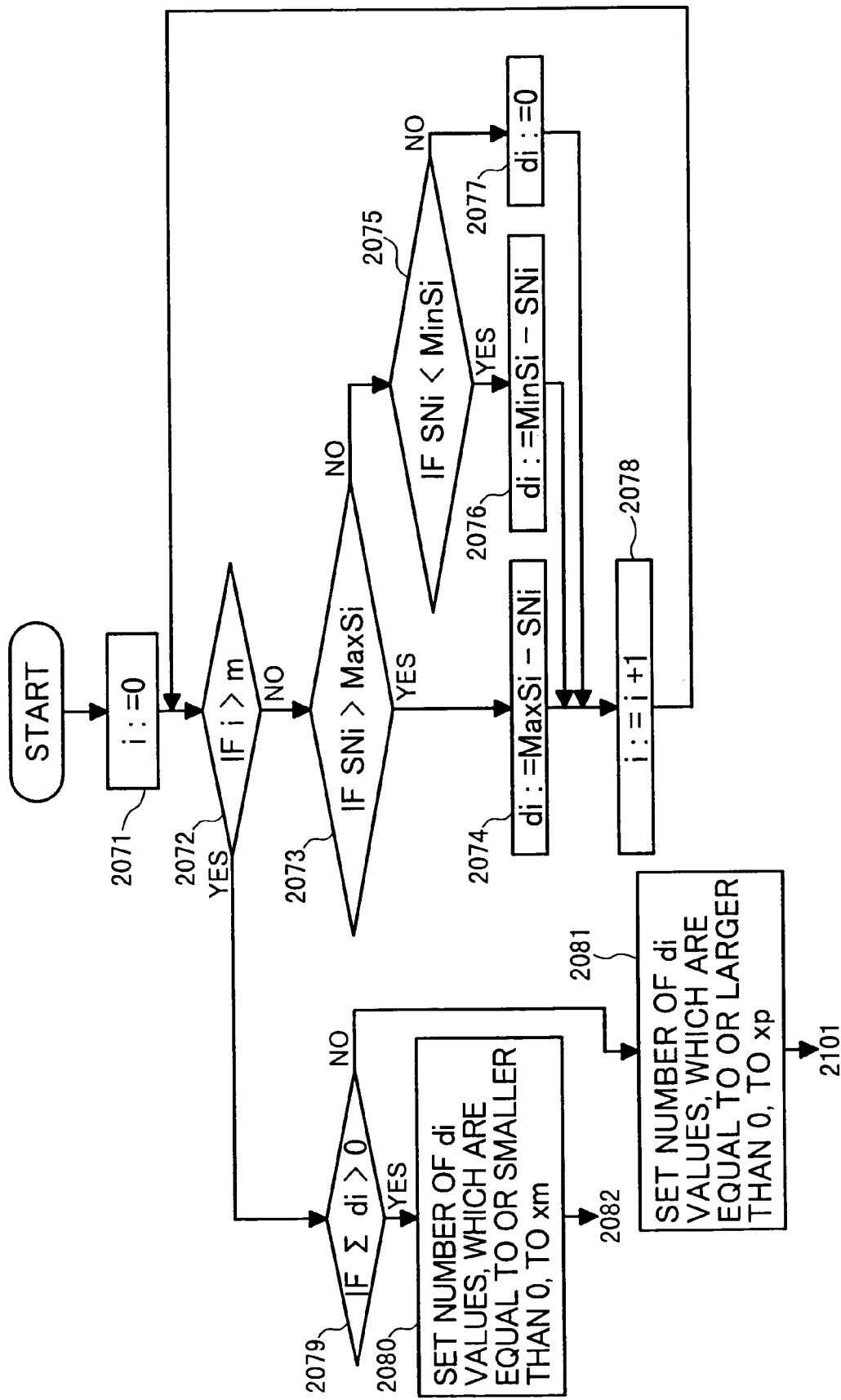
FIG. 12 is the first half of a flowchart describing an example of an allocation ratio correction sequence.
Figure 13:
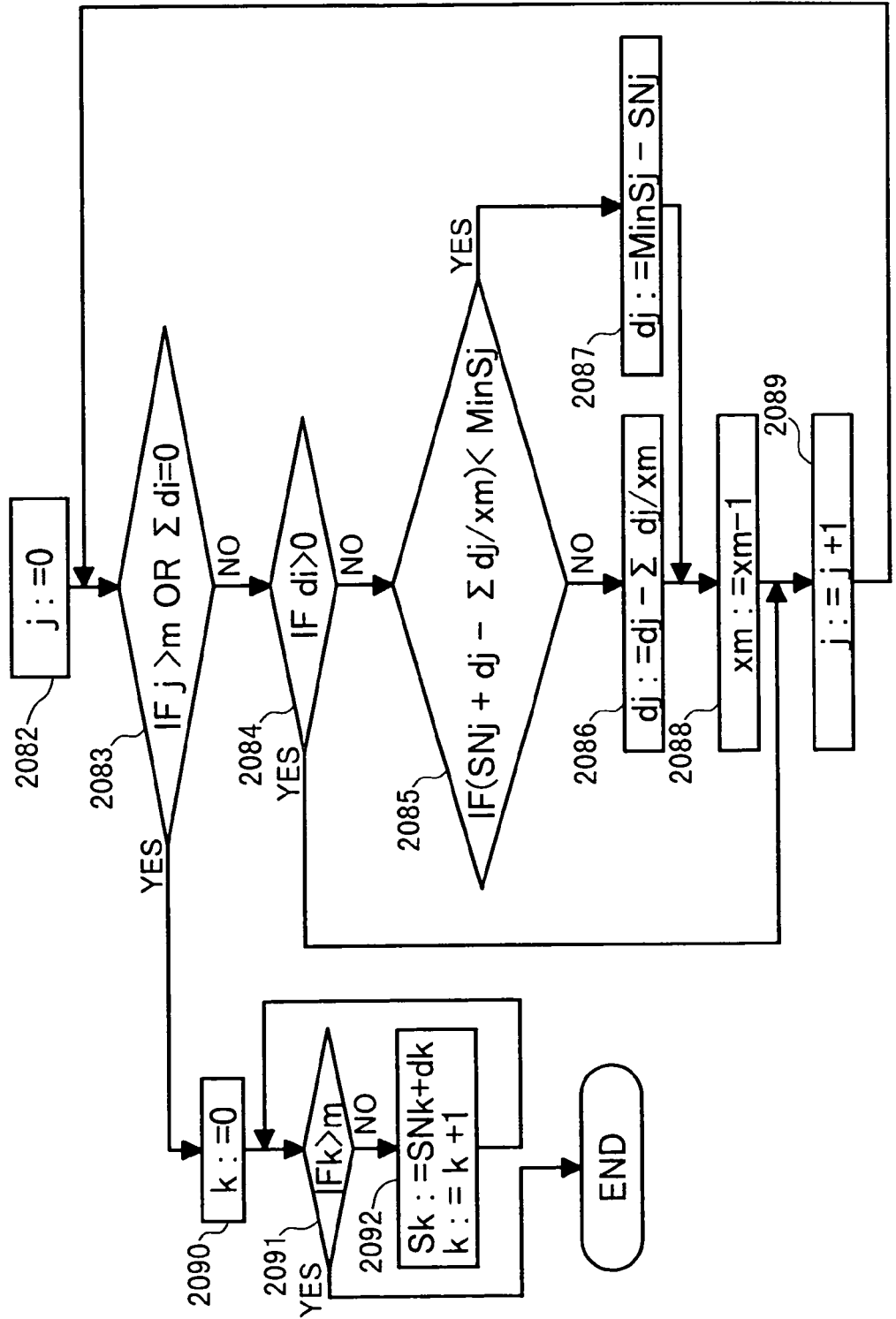
FIG. 13 is the middle of the flowchart describing the example of the allocation ratio correction sequence.
Figure 14:
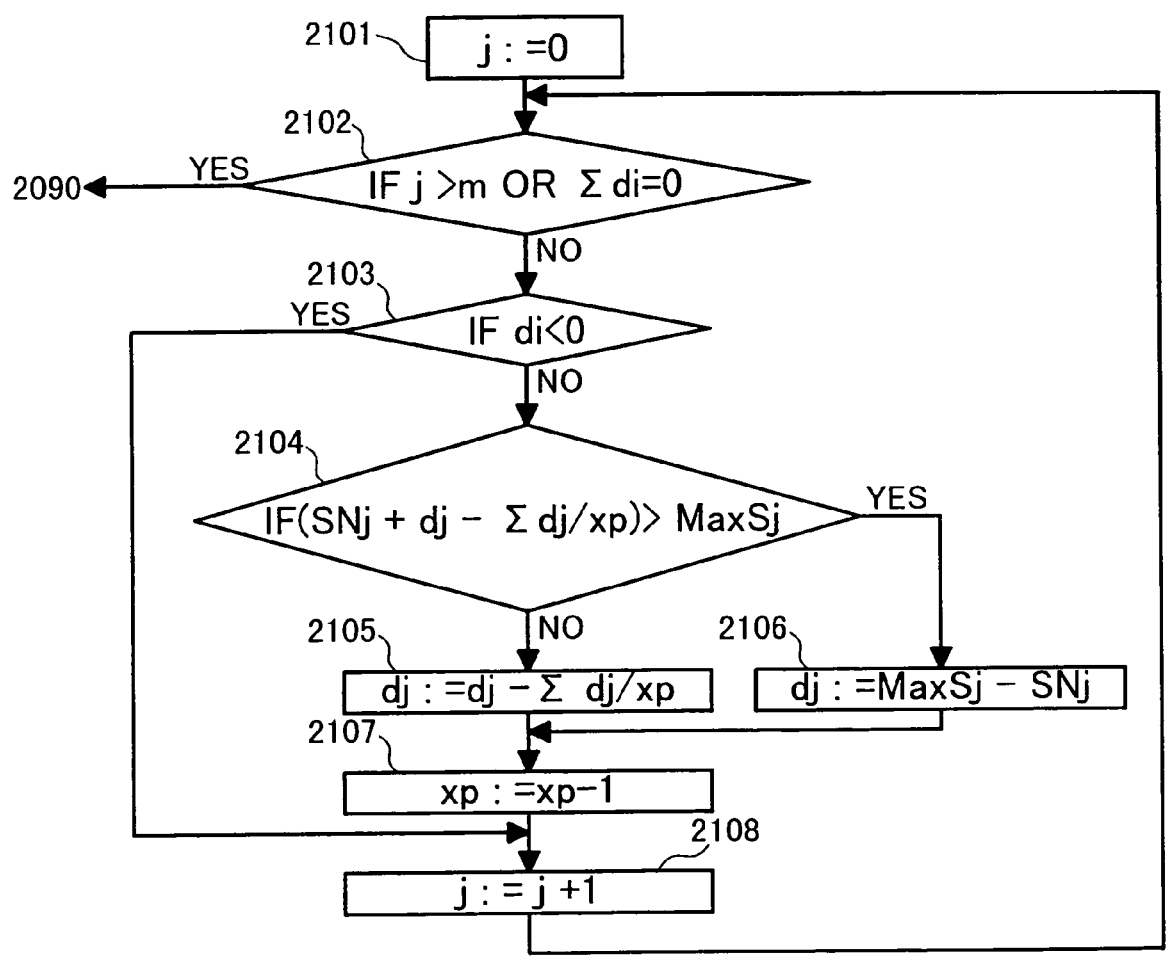
FIG. 14 is the second half of the flowchart describing the example of the allocation ratio correction sequence.

FIG. 12, FIG. 13, and FIG. 14 indicate details of step 2022 of an allocation ratio correction sequence that is performed as part of the allocation ratio determination sequence described in FIG. 8.

To begin with, at steps 2071 to 2078 described in FIG. 12, a tentative CPU allocation ratio SNi relative to an LPAR i falls between an upper limit MaxSi, which is specified in the entry section 111i relative to the LPAR i (21i) in the item of entry 1110 for the setting concerning a range of allocation ratio values which is contained in the input user interface 1001, and a lower limit MinSi specified in the entry section 112i relative thereto (MinSi≦SNi≦MaxSi). If the tentative CPU allocation ratio SNi does not fall between the upper and lower limits, a minimum value di satisfying the following condition is worked out:

$$Min Si \leq SNi+di \leq MaxSi$$

At step 2071, the loop counter i is initialized to 0. Steps 2073 to 2078 are repeatedly performed until it is found at step 2072 that the counter value i is larger than m. At step 2073, it is checked if the tentative CPU allocation ratio SNi is larger than the upper limit MaxSi. If the tentative CPU allocation ratio SNi is larger, the minimum value di is calculated by solving MaxSi−Sni at step 2074 (di is a negative value).

If it is found at step 2073 that Sni is equal to or smaller than MaxSi, it is checked at step 2075 if the tentative CPU allocation ratio SNi is smaller than the lower limit MinSi. If the tentative CPU allocation ratio SNi is smaller, the minimum value d is calculated by solving MinSi−SNi at step 2076 (d is a positive value).

If it is found at step 2075 that SNi is equal to or larger than MaxSi, MinSi≦SNi≦MaxSi is satisfied. The minimum value di is set to 0 at step 2077. If the value di is calculated at any of steps 2074, 2076, and 2077, the loop counter i is incremented by one. Control is then returned to step 2072.

If the condition stated at step 2072 is true, the values di relative to all the LPARs 210 to 21m have been worked out.

The calculated di value is added to the tentative CPU allocation ratio SNi, and the resultant value is adopted as a CPU allocation ratio Si Consequently, the CPU allocation ratio Si relative to any l, PAR satisfies the condition of MinSi≦Si≦MaxSi.

However, since the tentative CPU allocation ratio is increased by the di value, ΣSi may not come to 100%.

Therefore, at step 2079 and thereafter, the Si value is corrected so that it will fall within a range defined with the upper limit MaxSi and the lower limit MinSi and ΣSi will equal 100.

At step 2079, it is checked if Σdi (a sum total of di values where i ranges from 0 to m) is positive. If Σdi is positive, the number of di values that are equal to or smaller than 0 is set to xm at step 2080, and steps 2082 and thereafter described in FIG. 13 are performed.

If it is found at step 2079 that Σdi is equal to or smaller than 0, the number of di values that are equal to or larger than 0 is set to xp at step 2081, and steps 2101 and thereafter described in FIG. 14 are performed.

At step 2082 in FIG. 13, the loop counter j is initialized to 0. It is checked at step 2083 if the counter value j is larger than m. Steps 2084 to 2089 are repeatedly performed until Σdi becomes equal to 0.

The tentative CPU allocation ratios SNi are calculated during CPU allocation ratio calculation so that the sum thereof, that is, ΣSNi will come to 100%. Therefore, if Σdi is positive, Σ(SNi+di) is larger than 100%.

Therefore, the CPU allocation ratios relative to some LPARs must be corrected to assume smaller values. If the di value is larger than 0, it means that the tentative CPU allocation ratio SNj itself is smaller than the lower limit MinSj. Consequently, since SNj+di equals MinSj, the CPU allocation ratio relative to the LPAR must not be decreased.

In other words, CPU allocation ratios to corrected to assume smaller values are those to which di values that are equal to or smaller than 0 are added. Steps 2085 to 2089 are performed on CPU allocation ratios to which the di values that are equal to or smaller than 0 are judged to be added at step 2084.

By what values the CPU allocation ratios must be decreased are determined so that the sum of final CPU allocation ratios will come to 100%. A value Σdj by which the sum of CPU allocation ratios exceeds 100% is divided by the number xm of CPU allocation ratios that can be corrected, that is, Σdj/xm is solved. The resultant value is subtracted from each of the CPU allocation ratios to be corrected. However, SNj+di−Σdj/xm must not be smaller than MinSj. It is therefore judged at step 2085 whether SNj+di−Σdj/xm is smaller than MinSj. If SNj+di−Σdj/xm is not smaller, dj:=dj−Σdj/xm is solved at step 2086.

On the other hand, if SNj+di−ΣdVxm is smaller than MinSj, a dj value is corrected as expressed below so that a CPU allocation ratio will be equal to MinSj. That is to say, $$dj:=MinSj-SNj$$

After the dj value is thus corrected, xm is decremented by one at step 2088. The loop counter j is incremented by one at step 2089. Control is then returned to step 2083.

When the condition stated at step 2083 is true, the loop is escaped. All the dj values have been corrected. At steps 2090 to 2092, a final CPU allocation ratio Si relative to the LPAR i is calculated as follows:

$$Sk:=SNk+dk$$

The sequence is then terminated. At step 2092, the counter k is incremented by 1.

At step 2101 described in FIG. 14, the loop counter j is initialized to 0. Steps 2103 to 2108 are repeatedly performed until it is judged at step 2102 that j is larger than m or Σdi equals 0.

Tentative CPU allocation ratios SNi are calculated during CPU allocation ratio calculation so that the sum thereof ΣSNi will come to 100%. If Edi is negative, it means that Σ(SNi+di) is smaller than 100%.

Therefore, some CPU allocation ratios must be corrected to assume larger values. When di is smaller than 0, it means that a tentative CPU allocation ratio SNj itself is larger than MaxSj. Consequently, SNj−i−di equals MaxSj. Therefore, the CPU allocation ration relative to the LPAR must not be increased. In other words, CPU allocation ratios to be corrected to assume larger values are those having di values, which are equal to or larger than 0, added thereto.

At step 2103, steps 2104 to 2107 are performed on CPU allocation ratios having di values, which are equal to larger than 0, added thereto.

By what values CPU allocation ratios should be increased are determined so that the sum of final CPU allocation ratios will come to 100%. A value Σdj by which the sum of CPU allocation ratios falls below 100% is divided by the number xp of CPU allocation ratios that can be corrected, that is, Σdj/xp is solved. The resultant value is subtracted from each of the CPU allocation ratios to be corrected (Σdj/xp is negative), whereby the CPU allocation ratios are corrected.

However, SNj+di−Σdj/xp must not be larger than MaxSj. It is larger than MaxSj. If SNj+di−Σdj/xp is not larger than MaxSj, a dj value is corrected as expressed below:

$$dj:=dj\, \Sigma dj/xp$$

If SNj+di−Σdj/xp is larger than MaxSj, the dj value is corrected as expressed below so that a CPU allocation ratio concerned will equal MaxSj.

$$di:=\text{Max}Sj-SNj$$

After the dj value is corrected, xp is decremented by 1 at step 2107. The loop counter j is incremented by 1 at step 2108, and control is returned to step 2102.

When the condition stated at step 2102 is true, the loop is escaped. At this time, all dj values have been corrected. At steps 2090 to 2092 (FIG. 13), a final CPU allocation ratio Si relative to the LPAR i is calculated according to the following expression:

$$Si:=SNi+di$$

The sequence is then terminated.

6. Overall Operation

Through the foregoing processing, based on the characteristics of workloads including applications (services or demons) to be run on OSs in LPARs, a kind of use ratios to be measured as loads that are to be accomplished in the LPARs is designated through the input user interface 1001. Moreover, an appropriate value is designated for the item of entry 1500 for the setting concerning a control cycle. Consequently, allocation ratios can be varied appropriately along with an increase in the workloads (occurrence of peaks).

Eventually, computer resources can be appropriately and automatically is allocated to the LPARs.

For example, assume that a Web server application runs on an OS a in an LPAR a and a database server application runs on an OS b in an LPAR b. In this case, even if the CPU use ratios relative to the LPARs are equal to one another, a resource required to accomplish a load (the characteristics of a workload are) is different from LPAR to LPAR. In the Web server, an increase in a load signifies an increase in a network use ratio. In the database server, an increase in a load signifies an increase in a disk use ratio (or a cache memory use ratio).

A manager uses the input user interface 1001 to designate a kind of use ratios to be measured as loads according to the characteristics of a workload including applications and running on each OS i in each LPAR i. In the aforesaid case, the manager designates measurement of network use ratios for the LPAR a in which the Web server application runs, and designates measurement of disk use ratios for the LPAR b in which the database server application runs. Consequently, allocation ratios of computer resources can be dynamically varied depending on the kinds and sizes of loads.

In particular, as far as the Web server application is concerned, it is very hard to predict the timing of a peak load. According to the present invention, a kind of use ratios to be measured as loads is designated according to the characteristic of a workload, and adaptive control is extended. Consequently, allocation ratios of computer resources can be automatically and appropriately varied depending on an increase or decrease in loads.

The input user interface 1001 permits users to select any of non conversion, moving average calculation, and normalization as a kind of manipulation to be performed on measured loads. This enables tuning (optimization) to be performed according to a situation of whether a load to be accomplished in each LPAR is a peak load.

Specifically, if non conversion is designated as a kind of load manipulation, dynamic variation of allocation ratios of computer resources becomes linearly responsive to a change in loads. If moving average calculation is designated, frequently variation of allocation ratios responsive to a minute change in loads is suppressed. An overhead stemming from variation of allocation ratios can be minimized. Tuning (optimization) can be achieved over a wide range by appropriately designating a combination of a control cycle and the number of samples. Otherwise, if normalization is designated, frequent variation of allocation ratios responsive to a minute change in loads can be suppressed, and an overhead stemming from the variation of allocation ratios can be minimized. Consequently, tuning can be achieved over a wide range by appropriately designating a combination of the control cycle and the number of steps with which discrete values required for normalization are associated.

Moreover, either of the proportioning method and threshold method can be designated for the item of entry 1200 concerning an allocation ratio calculation method. When allocation ratios must be linearly responsive to a change in loads, the proportioning method is adopted. When frequent variation of allocation ratios responsive to a minute change in loads must be suppressed, the threshold method is adopted. Consequently, an overhead stemming from the frequent variation of allocation ratios can be minimized. Moreover, tuning (optimization) can be achieved over a wide range by appropriately designating a heavy-load judgment threshold and a light-load judgment threshold.

Moreover, the output user interface 1002 assists in displaying the relationships between loads to be accomplished in LPARs i and time instants, and the contents of time-series behavior of allocation ratios. A user (manager) can be informed of how allocation ratios of computer resources have been varied responsively to a change loads. Based on a history listing the loads and allocation ratios, the manager can review various parameters whose values are designated through the input user interface 1001. Consequently, tuning can be optimally achieved for each LPAR LPAR i.

Figure 15:
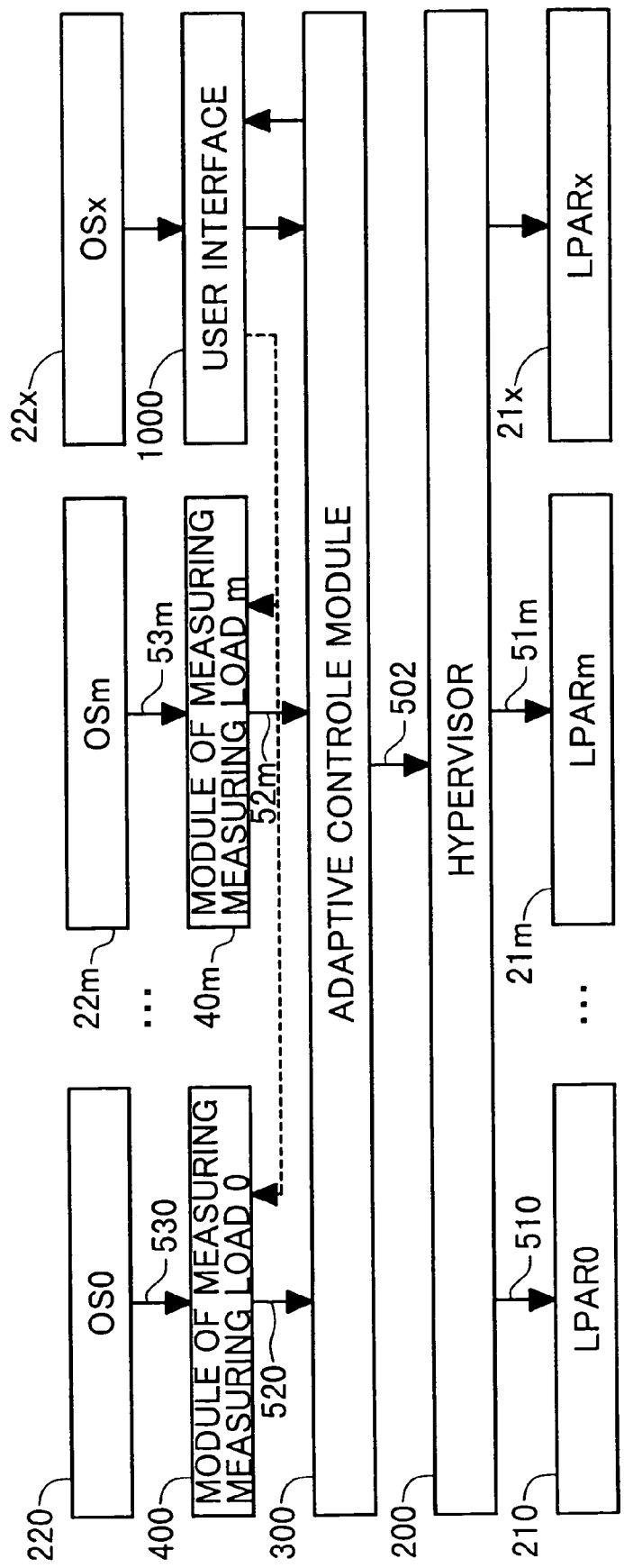
FIG. 15 is a schematic diagram showing a module configuration of a virtual computer in accordance with the second embodiment.

FIG. 15 shows the second embodiment of the present invention. The second embodiment is partly different from the first embodiment. An LPAR in which the user interface 1000 is installed is included independently.

Only differences from the first embodiment are described below.

Referring to FIG. 15, an LPAR x dedicated to management is included independently of the LPARs 0 to m 210 to 21m that are included in the first embodiment as shown in FIG. 3. An OS x is installed in the LPAR x, and the adaptive control module 300 and user interface 1000 are installed on the OS x.

Input and output screen images representing the user interface 1000 are displayed on the screen image provided by the OS x. Moreover, no load measuring module is installed on the OS x. Communications among the load measuring modules 400 to 40m, adaptive control module 300, and user interface 1000 are achieved using a socket or an inter-LPAR communication technique. The other components are identical to those of the first embodiment.

In the present embodiment, the adaptive control module 300 and user interface 1000 run in the LPAR x 22x dedicated to management. The other LPARs 0 to m lack computer resources required to dynamically vary allocation is ratios relative to the LPARs. Consequently, the OSs 0 to m concentrate on run of applications, though the load measuring modules 400 to 40m reside in the OSs. This leads to improved use efficiency of the LPARs.

Figure 16:
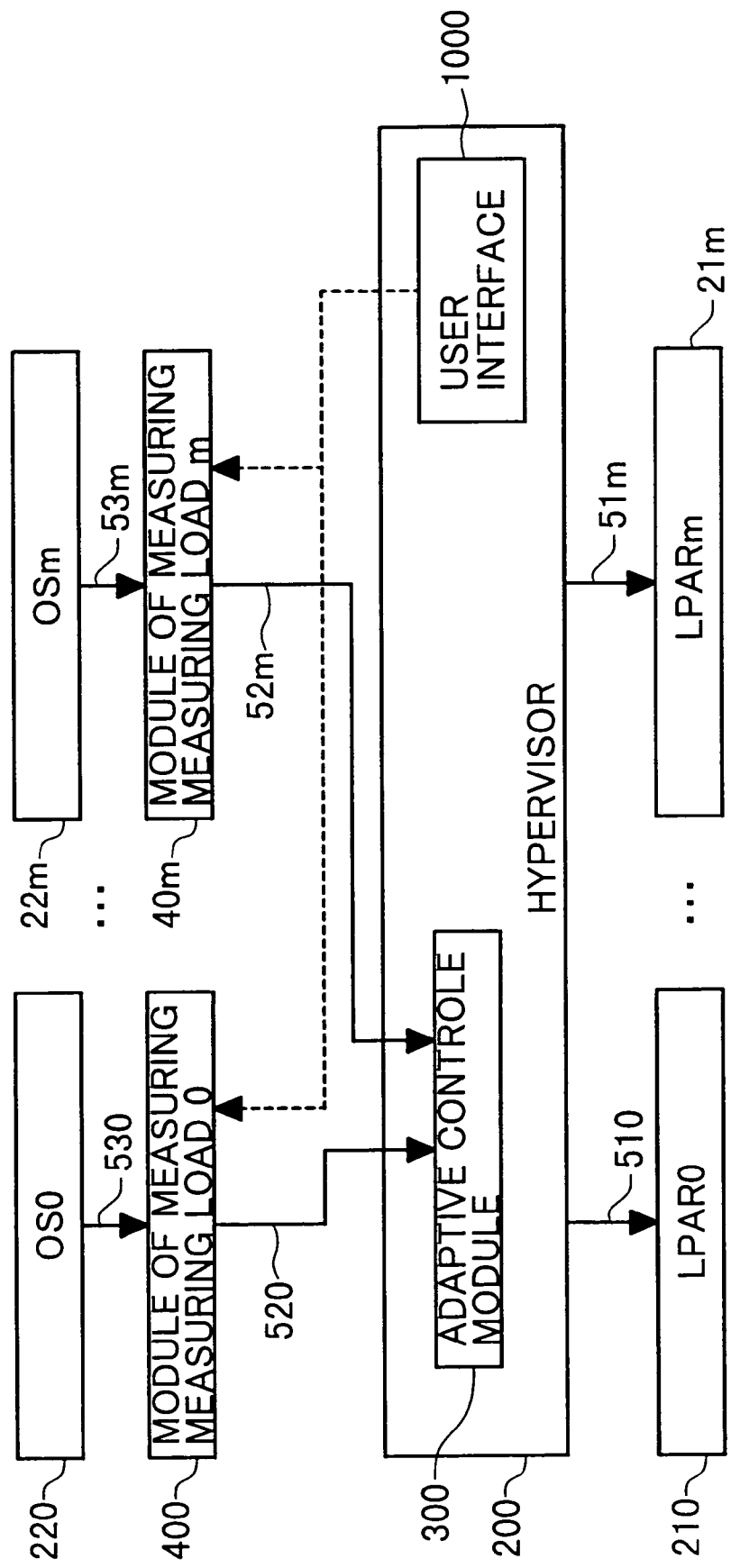
FIG. 16 is a schematic diagram showing a module configuration of a virtual computer in accordance with the third embodiment.

FIG. 16 shows the third embodiment of the present invention. The third embodiment is partly different from the first embodiment, and has the adaptive control module 300 and user interface 1000 incorporated in the hypervisor 200.

Only differences from the first embodiment will be described below.

Referring to FIG. 16, the adaptive control module 300 and user interface 1000 included in the first embodiment as shown in FIG. 3 are incorporated in the hypervisor 200. Input and output screen images representing the abilities of the user interface 1000 are displayed on the console 140 of the physical computer 130.

Communications among the load measuring modules 400 to 40m, adaptive control module 300, and user interface 1000 are achieved using a common memory that is required by an inter-LPAR communication technology. Moreover, communications between the adaptive control module 300 and user interface 1000 are achieved using an internal memory of the hypervisor 200. The other components are identical to those of the first embodiment.

Figure 17:
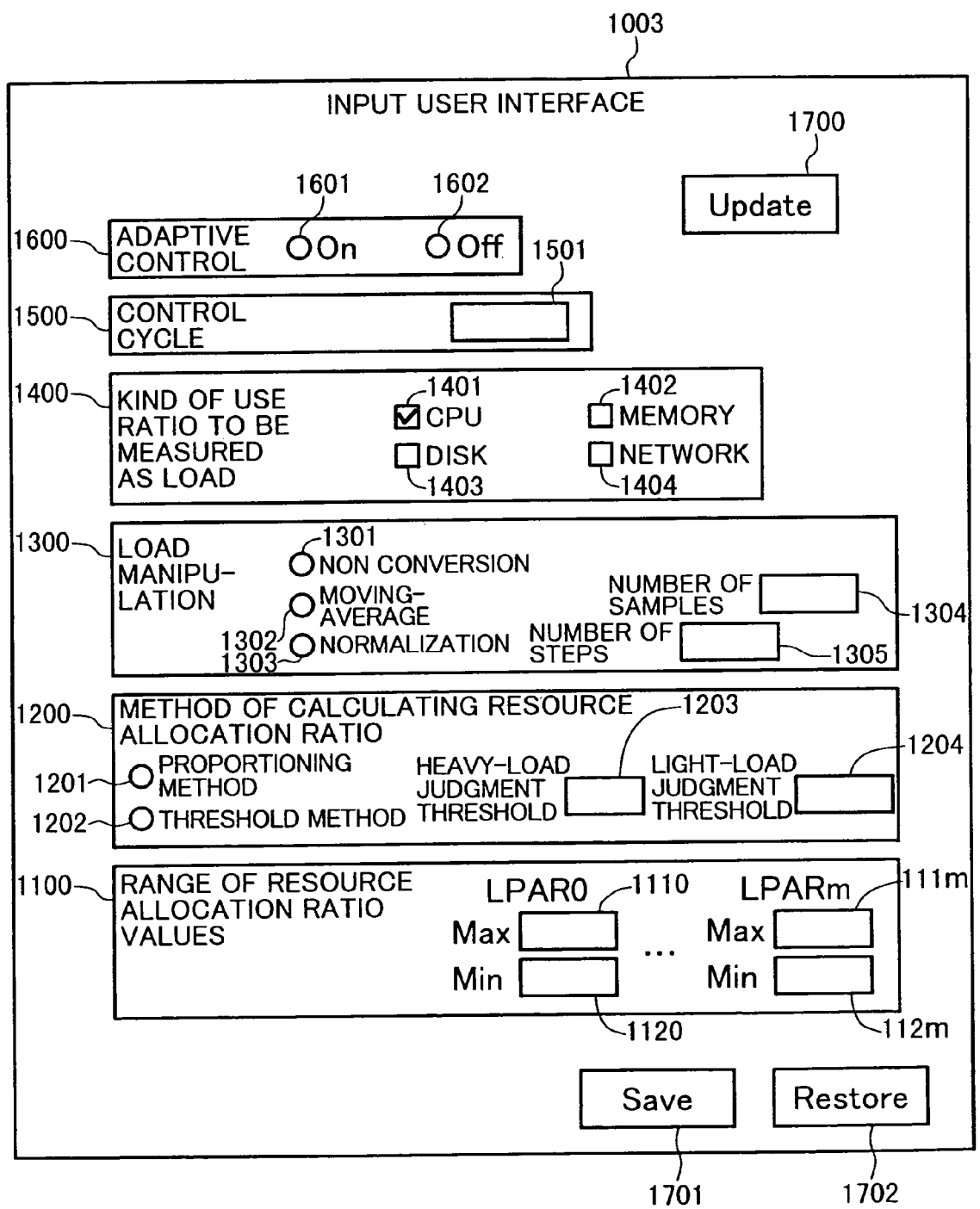
FIG. 17 shows a screen image representing an input user interface included in the fourth embodiment.

FIG. 17 shows the fourth embodiment. The fourth embodiment is different from the first embodiment in part of the user interface.

Only a difference from the first embodiment will be described below.

An input user interface 1003 shown in FIG. 17 is different from the input user interface included in the first embodiment as shown in FIG. 4 in a point that a Save button 1701 and a Restore button are included. The other components are identical to those of the first embodiment shown in FIG. 4.

The input user interface 1003 has the Save button 1701 and Restore button 1702 disposed in the lower part of a display area.

When the Save button 1701 is pressed, that is, clicked, the settings for the items of entry 1100 to 1600 are written in a setting hold file on a predetermined disk. When the Restore button 1702 is clicked, the setting hold file in which the settings are recorded is read and the items of entry 1100 to 1600 are restored to the recorded settings.

Consequently, a manager is released from designating settings through the input user interface 1003 every time the virtual computer system in accordance with the present invention is started up. Once the setting hold file is called, the recorded settings can be restored.

Figure 18:
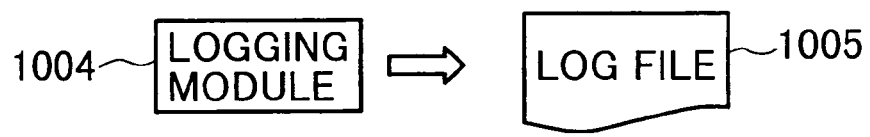
FIG. 18 is a conceptual diagram showing a logging module adopted as an output user interface according to the fifth embodiment.

FIG. 18 shows the fifth embodiment. The fifth embodiment is different from the first embodiment in a point that the output user interface (output module) included in the user interface is replaced with a logging module 1004. The other components are identical to those of the first embodiment. Only differences from the first embodiment will be described below.

The logging module 1004 shown in FIG. 18 is installed on any of the OSs 0 to m 210 to 22m included in the first embodiment.

The logging module 1004 receives from the adaptive control module 300 at regular intervals the loads LO to Lm or manipulated loads LAO to LAm to be accomplished by the OSs 220 to 22m, the CPU allocation ratios SO to Sm relative to the LPARs 210 to 21m, and the reasons for variation of allocation ratios. The logging module 1004 time-sequentially writes the received information in a log file 1005.

A manager references the log file 1005 to learn how allocation ratios of computer resources have been varied depending on a change in loads. Eased on the history listing the loads and allocation ratios, the manager reviews parameter values to be designated through the input user interface 1001. Thus, the manager can tune the computer system LPAR by LPAR.

In order to adapt the logging module 1004 to the second embodiment, the logging module 1004 is installed in the management LPAR x in which the adaptive control module 300 resides.

In order to adapt the logging module 1004 to the third embodiment, the logging module 1004 is incorporated in the hypervisor 200.

Figure 19:
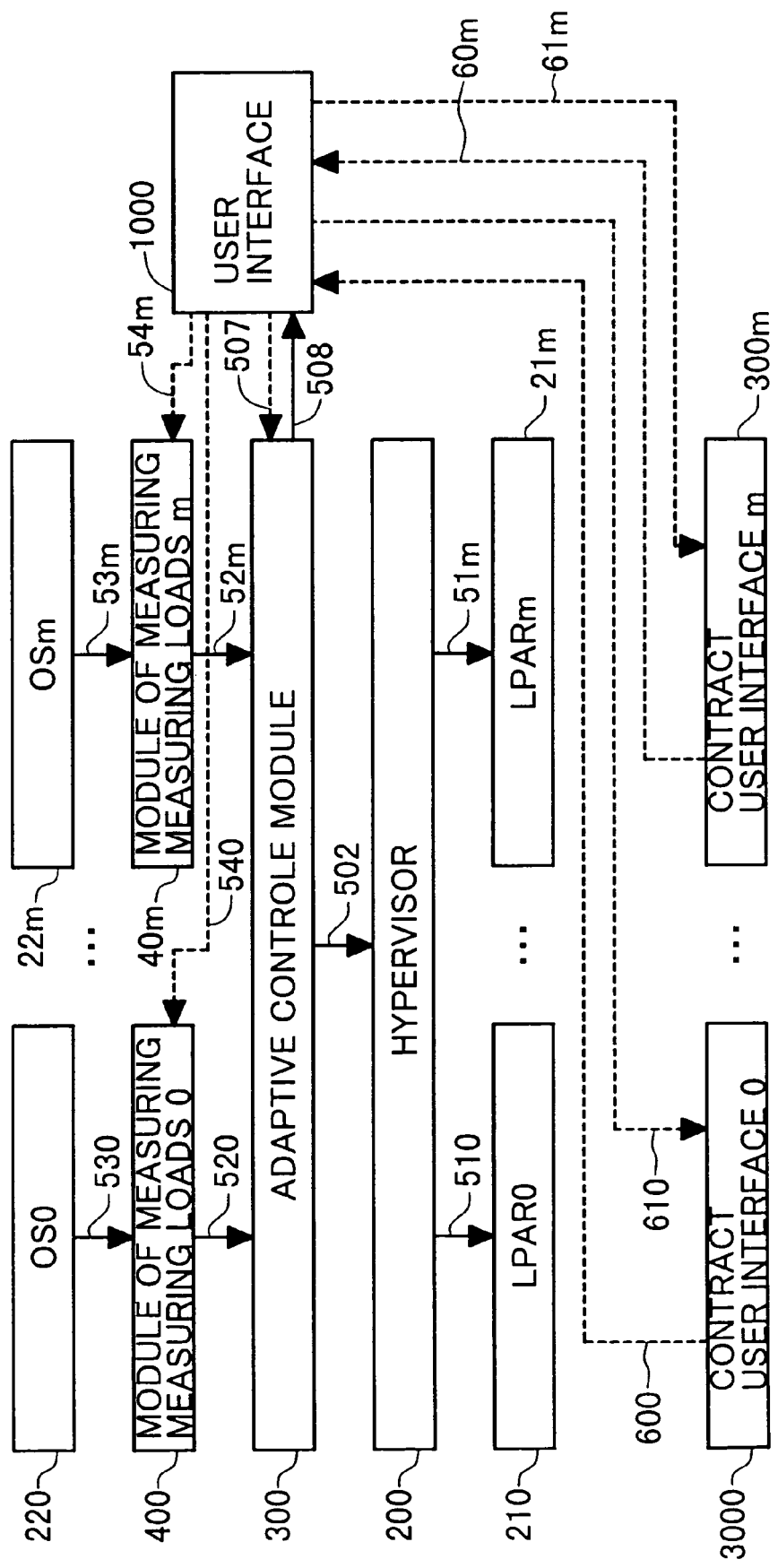
FIG. 19 is a schematic diagram showing a module configuration of a virtual computer in accordance with the sixth embodiment.

FIG. 19 shows the sixth embodiment. The sixth embodiment is different from the first embodiment in a point that contract user interfaces assisting users who utilize LPARs are added to the user interface 1000. The other components are identical to those of the first embodiment.

Contract user interfaces 0 to m (3000 to 300m) are associated with the LPARs 0 to m (210 to 21m).

In the virtual computer system of the present embodiment, an LPAR is offered to each customer who has made a contract. Customers access LPARs assigned to the customers over the Internet (or any other network). The contract user interfaces 3000 to 300m are displayed on the screens (display means) of the computers owned by the customers who have made a contract.

The contract user interface 0 3000 is linked to the user interface 1000 by means of input data 600 and output data 610. Moreover, the contract user interface m 300m is linked to the user interface 1000 by means of input data 60m and output data 61m.

The contract user interfaces 3000 to 300m permit a service situation such as an allocation ratio at which a computer resource is allocated to a customer by the virtual computer system in accordance with the present invention.

Figure 20:
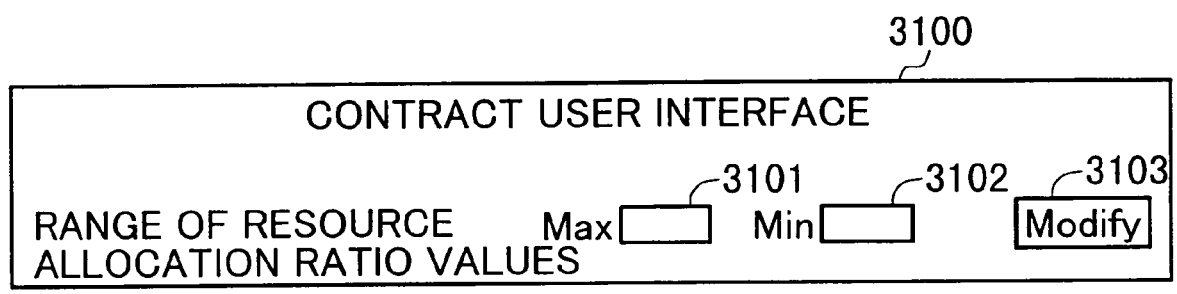
FIG. 20 shows a screen image representing a contract input user interface.
Figure 21:
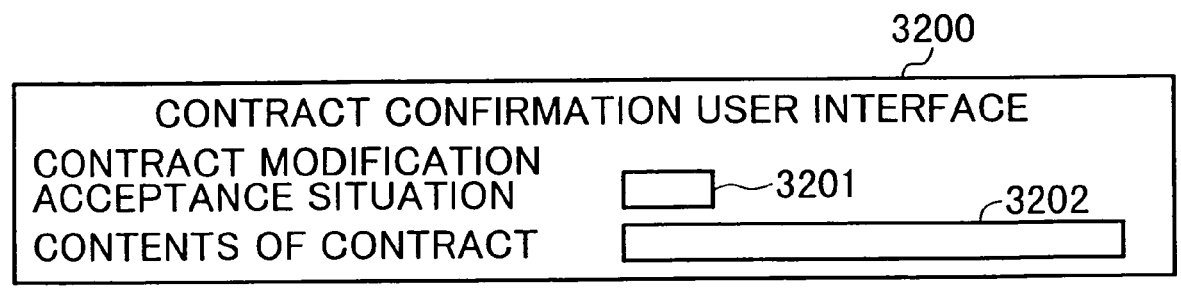
FIG. 21 shows a screen image representing a contract confirmation user interface.

Each of the contract user interfaces 3000 to 300m consists of a contract input user interface 3100 shown in FIG. 20 and a contract confirmation user interface 3200 shown in FIG. 21. The contract user interface may include a contract output user interface 3300 shown in FIG. 22.

Next, the contract input user interface 3100 shown in FIG. 20 will be described below.

The contract input user interface shown in FIG. 20 is an interface permitting a contract customer to modify the contents of a contract. The contents of a contract describe an upper limit and a lower limit for a CPU allocation ratio relative to a contract LPAR. The upper limit and lower limit are specified in an entry section 3101 and an entry section 3102 respectively.

A customer designates an upper limit and a lower limit for a CPU allocation ratio relative to an LPAR that is assigned to the customer in consultation with his/her knowledge of a workload to be accomplished in the LPAR. The upper and lower limits are specified in the entry sections 3101 and 3102 contained in the contract input user interface 3100.

A button 3103 is clicked in order to validate (or to modify a contract) the upper and lower limits for an allocation ratio (a range of allocation ratio values) specified in the entry sections 3101 and 3102 shown in FIG. 20.

When the Modify button 3103 is pressed, that is, clicked, the information of the upper and lower limits for an allocation ratio specified in the entry sections 3101 and 3102 is transmitted as the input data 600 shown in FIG. 19 to the input user interface 1001 included in the user interface 1000.

The input user interface 1001 checks if a designated range of allocation ratio values is proper. If the designated range is proper, the transmitted values are specified in the entry sections 111i and 112i relative to the LPAR i in the item of entry 1100 for the setting concerning a range of allocation ratio values contained in the input user interface 1001. Similarly to when the Update button 1700 shown in FIG. 4 is clicked, the setting is validated.

If a range of allocation ratio values is improper (if another customer designates a large value as a lower limit and the value designated by the customer concerned cannot be adopted as a lower limit), the transmitted values for upper and lower limits are not reflected in the setting concerning a range of allocation ratio values for the item of entry 1100.

The input user interface 1001 allows a screen image representing the contract confirmation user interface 3200, which is shown in FIG. 21, to appear on the screen of the customer's computer. Thus, the customer is informed of whether the previous modification of a contract has been accepted.

Next, the contract confirmation user interface shown in FIG. 21 will be described below.

The contract confirmation user interface 3200 shown in FIG. 21 is a user interface permitting a customer to check if a request for modification of a contract the customer has made through the contract input user interface 3100 has been accepted. A display section 3201 specifies an acceptance situation concerning modification of a contract. In the display section 3201 specifying an acceptance situation, if a request for modification of a contract has been accepted. Accepted is displayed. Otherwise, Invalid is displayed.

A request for modification of a contract is not accepted unless a range of allocation ratio values transferred from the contract input user interface 3100 to the input user interface 1001 is proper.

If a request for modification of a contract is accepted, the modified contents of a contract are listed in a display section 3202. If the request for modification of a contract is unaccepted, the reasons are listed therein.

Next, the contract output user interface shown in FIG. 22 will be described below.

Figure 22:
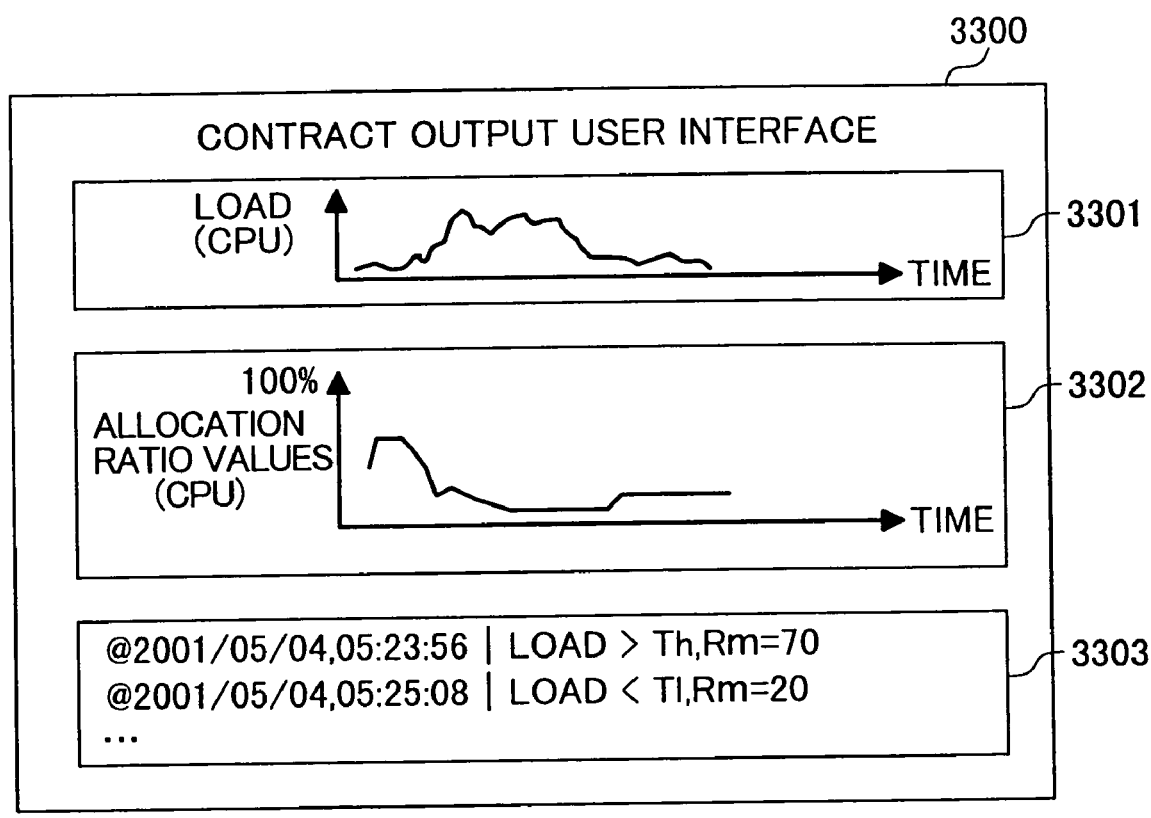
FIG. 22 shows a screen image representing a contract output user interface.

The contract output user interface 3300 shown in FIG. 22 graphically displays in a display section 3301 a time-series behavior of a load or manipulated load to be accomplished by an OS running in an LPAR assigned to the customer concerned. Moreover, a time-series behavior of an allocation ratio of a computer resource relative to the LPAR is graphically displayed in a display section 3302. The reasons for variation of an allocation ratio are listed in a display section 3303. Unlike the output user interface 1002 included in the first embodiment as shown in FIG. 5, the contract output user interface 3300 displays only information concerning an LPAR which the customer concerned uses by contract. Information concerning LPARs for which the other customers have made a contract is not displayed.

Consequently, the contract user interfaces 3000 to 300m permit the customers who use the LPARs to check a time-series behavior of a load to be accomplished in an LPAR each customer uses or to check a time-series behavior of an allocation ratio. Moreover, an allocation ratio can be varied within a range of allocation ratio values stipulated in a contract. Customers can check the contents of a contract any time. Based on a history listing a change in a load and a change in an allocation ratio, a customer can vary the allocation ratio by himself/herself. This leads to improved quality of services to be rendered to users of LPARs.

The contract output user interface 3300 is a user interface displaying values on the screen of the control 140. The contract output user interface 3300 may be replaced with the logging module 1004 shown in FIG. 18. The logging module 1004 may be installed in an access machine (computer or the like) which a customer uses to access the virtual computer system in accordance with the present invention over the Internet, and may be used to transfer a log file to the customer's access machine.

Figure 23:
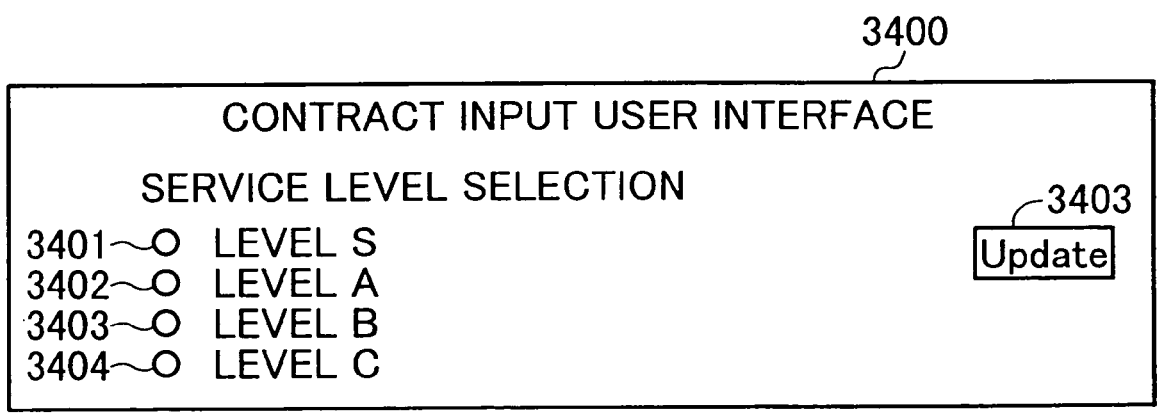
FIG. 23 shows a screen image representing a contract input user interface included in the seventh embodiment.

FIG. 23 shows the seventh embodiment. The seventh embodiment is different from the sixth embodiment in the contract input user interface 3100. The other components are identical to those of the sixth embodiment.

Referring to FIG. 23, a contract input user interface 3400 permits a user to designate more abstract contents than the contract input user interface 3100 shown in FIG. 20 does. The contract input user interface 3400 is intended to simplify an LPAR user's maneuver to be performed for varying an allocation ratio.

Specifically, buttons 3401 to 3404 are radio buttons only one of which is turned on in order to designate level S, A, B, or C as a service level. The button 3401 is used to designate level S, the button 3402 is used to designate level A, the button 3403 is used to designate level B, and the button 3404 is used to designate level C.

Designating level S signifies that a contract is made for a service of level S whose quality is the best. Designating level C signifies that a contract is made for a service of level C whose price is the lowest. Designating level A signifies that a contract is made for a service of level A whose quality is good enough and whose price is not so high as the service of level S is. Designating level B signifies that a contract has been made for a service of level B whose price is reasonable and whose quality is better than the service of level C. What is the service of what level is stipulated in a contract.

Referring to FIG. 23, there is shown a Modify button 3403 to be used to modify the contents of a contract. When this button is clicked, a selected service level is transferred to the input user interface 1001. On receipt of the service level, the input user interface 1001 references a predetermined chart (not shown) or the like to convert the service level into an upper limit and a lower limit for an allocation ratio of a computer resource. It is then judged whether the values are proper (if service levels for which a contract has been made with other customers cannot be observed, a service level instructed by the customer concerned is judged to be improper). If the values are proper, the values of upper and lower limits drawn out from the chart are specified in the entry sections 111i and 112i for the LPAR i concerned in the item of entry 1100 for the setting concerning a range of allocation ratio values which is contained in the input user interface 1001. Similarly to when the Update button 1700 is clicked, the setting is validated. If the values are improper, the values for the upper and lower limits are not reflected in the setting concerning a range of allocation ratio values for the item of entry 1100.

The contract input user interface 3400 issues an instruction that instructs modification of the contents of a contract. In response to the instruction, the input user interface 1001 allows a screen image representing the contract confirmation user interface 3200 to appear on the screen of a customer's computer. The contract confirmation user interface 3200 is identical to that included in the sixth embodiment. Moreover, the contract output user interface 3300 is identical to that included in the sixth embodiment.

Incidentally, a virtual computer system may include an output user interface that provides loads measured by a load measuring means or allocation ratios of computer resources relative to logical partitions which are determined by an adaptive control means. The output user interface graphically displays time-series behavior of in loads to be accomplished by OSs in logical partitions which are measured by the load measuring means, and time-series behavior of allocation ratios of computer resources relative to the logical partitions which are determined by the adaptive control means.

A virtual computer system may include an output user interface that provides loads measured by a load measuring means or allocation ratios of computer resources relative to logical partitions which are determined by an adaptive control means. When the adaptive control means varies the allocation ratios of the computer resources relative to the logical partitions, the output user interface displays the reasons for the variation.

A virtual computer system may include a hypervisor partitions, that runs OSs in the LPARs, and that controls allocation of resources of the physical computer to the logical partitions. The virtual computer system may further include a load measuring means, an adaptive control means, and a logging means. The load measuring means measures loads to be accomplished by the OSs in the logical partitions. Based on the loads to be accomplished by the OSs in the logical partitions which are measured by the load measuring means, the adaptive control means determines the allocation ratios of the computer resources relative to the logical partitions. If the determined allocation ratios are different from the previous ones, the adaptive control means instructs the hypervisor to vary the allocation ratios of the resources. The logging means records in a (log) file time-sequential changes in the loads measured by the load measuring means and time-sequential changes in the allocation ratios of the computer resources relative to the logical partitions which are determined by the adaptive control means. Herein, the hypervisor may include a means that dynamically varies the allocation ratios of the computer resources relative to the logical partitions in response to an instruction issued from the adaptive control means. Furthermore, the logging means records in the log file a history listing the changes in the allocation ratios relative to the logical partitions made by the adaptive control means.

A virtual computer system may include a contract user interface that permits a customer to designate conditions for contract. The contract user interface includes a means that displays on the screen of the customer's computer a time-series behavior of a load to be accomplished by an OS in a logical partition assigned to the customer, a time-series behavior of an allocation ratio of a computer resource relative to the logical partition, and the reasons for variation of allocation ratios.

A virtual computer system may include a user interface that has a means for recording designated settings in a setting file, and a means for reading the setting file so as to restore settings held in the setting file through the user interface.

It should be noted that the disclosed embodiments are examples in all aspects but do not restrict the present invention. The scope of the present invention is defined with "What is Claimed is:" but not with the above description. The present invention shall encompass all variants that may be made in compliance with the contents of "What is Claimed is:" or an equivalent of the contents.

What is claimed is:

1. A virtual computer system having one or more CPUs and a main memory device and a virtual computer controller that divides a physical computer into a plurality of logical partitions, that runs an individual operating system in each of the logical partitions, and that controls allocation of resources of said physical computer to the logical partitions, said virtual computer system comprising:

a user interface for use by a manager, for storing a plurality of settings for controlling actions of said virtual computer system;

load measuring means for measuring loads of programs running in the logical partitions according to the settings stored in said user interface; and adaptive control means for determining allocation ratios of the computer resources relative to the logical partitions according to the settings stored in said user interface and to the loads of the programs running in the logical partitions measured by said load measuring means, and for instructing control according to the determined allocation ratio, wherein said virtual computer controller includes an allocation ratio varying means that dynamically varies allocation ratios of the computer resources relative to the logical partitions in response to the instruction issued from the adaptive control means, wherein said settings for controlling actions stored in said user interface includes a method of calculating resource allocation ratio to be measured by said load measuring means, and wherein said adaptive control means determines the allocation ratios of the computer resources relative to the logical partitions according to the loads of programs measured by said measuring means according to the method of calculating resource allocation ratio stored in said user interface, wherein the method of calculating resource allocation ratio comprises at least one of a) proportioning method for calculating the resource allocation ratio based on total sum of manipulated load and b) threshold method for calculating the resource allocation ratio based on heavy or light load judgment threshold.

2. A virtual computer system having one or more CPUs and a main memory device and a virtual computer controller that divides a physical computer into a plurality of logical partitions, that runs an individual operating system in each of the logical partitions, and that controls allocation of resources of said physical computer to the logical partitions, said virtual computer system comprising:

user interface for use by a manager, for storing a plurality of settings concerning to controlling actions of said virtual computer system;

load measuring means for measuring loads of programs running in the logical partitions according to the settings stored in said user interface;

adaptive control means for determining allocation ratios of the computer resources relative to the logical partitions according to the settings stored in said user interface and to the loads of the programs running in the logical partitions measured by said load measuring means, and for instructing control according the determined allocation ratio, wherein said virtual computer controller includes an allocation ratio varying means that dynamically varies allocation ratios of the computer resources relative to the logical partitions in response to the instruction issued from the adaptive control means, wherein said user interface includes a kind-of-use ratios setting means for setting a kind of use ratios to be measures as the loads of the programs, wherein said load measuring means measures use ratios of the kind set in said kind-of-use ratios setting means, and wherein said adaptive control means determines the allocation ratios of the computer resources relative to the logical partitions according to the use ratio of the kind set in said kind-of-use setting means and measured by said measuring means.

* * * * *

UNITED STATES PATENT AND TRADEMARK OFFICE
CERTIFICATE OF CORRECTION

| | | |
|---|---|---|
| PATENT NO. | : 7,865,899 B2 | Page 1 of 1 |
| APPLICATION NO. | : 11/485273 | |
| DATED | : January 4, 2011 | |
| INVENTOR(S) | : Shinichi Kawamoto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1209 days.

This patent is subject to a terminal disclaimer. --

Signed and Sealed this

Twenty-second Day of February, 2011

David J. Kappos
*Director of the United States Patent and Trademark Office*